United States Patent
Bowman et al.

(10) Patent No.: US 10,180,209 B2
(45) Date of Patent: Jan. 15, 2019

(54) EXPANDABLE MULTI-DISPLAY SUPPORT APPARATUS

(71) Applicant: Innovative Office Products, LLC, Easton, PA (US)

(72) Inventors: Stephen J. Bowman, Saylorsburg, PA (US); Peter J. Carrasquillo, Columbia, MO (US); Michael P. Smith, Allentown, PA (US); Carl J. Hochberg, Lehighton, PA (US)

(73) Assignee: Innovative Office Products, LLC, Easton, PA (US)

( * ) Notice: Subject to any disclaimer, the term of this patent is extended or adjusted under 35 U.S.C. 154(b) by 59 days.

(21) Appl. No.: 15/037,239

(22) PCT Filed: Dec. 5, 2014

(86) PCT No.: PCT/US2014/068914
§ 371 (c)(1),
(2) Date: May 17, 2016

(87) PCT Pub. No.: WO2015/085243
PCT Pub. Date: Jun. 11, 2015

(65) Prior Publication Data
US 2016/0281915 A1    Sep. 29, 2016

Related U.S. Application Data

(60) Provisional application No. 62/009,325, filed on Jun. 8, 2014, provisional application No. 61/912,418, filed on Dec. 5, 2013.

(51) Int. Cl.
*F16M 13/02* (2006.01)
*F16M 11/04* (2006.01)
(Continued)

(52) U.S. Cl.
CPC .......... *F16M 13/02* (2013.01); *F16M 11/045* (2013.01); *F16M 11/10* (2013.01);
(Continued)

(58) Field of Classification Search
CPC ................. A47B 2097/005; F16M 11/2014
(Continued)

(56) References Cited

U.S. PATENT DOCUMENTS

| 676,443 A | 6/1901 | Parish et al. |
| 3,006,592 A | 10/1961 | Davis, Jr. |

(Continued)

FOREIGN PATENT DOCUMENTS

| CN | 202520126 U | 11/2012 | |
| DE | 29707145 U1 * | 6/1997 | ............ A47B 19/10 |

(Continued)

OTHER PUBLICATIONS

US 7,428,141, 09/2008, Moscovitch (withdrawn)
(Continued)

*Primary Examiner* — Stanton L Krycinski
(74) *Attorney, Agent, or Firm* — Design IP

(57) ABSTRACT

The invention of the present application is an extendable, modular device (10) for supporting multiple displays. The modular display support device comprising: a column (18), being linear and extending along a longitudinal axis; a plurality of beam members comprising a center beam member (24) and a side beam member (46a, 46b), each of the plurality of beam members having identical front and rear channels (42a, 42b), each of the front and rear channels including opposing top and bottom rails (40a, 40b); a hinge joint (60a) adapted to connect the side beam member to the center beam member and enable the side beam member to pivot about a pivot axis; a beam attachment bracket adapted to secure either of the plurality of beam members to the (Continued)

column; and at least one display mounting assembly comprising a pair of rail mounting brackets that mate together within one of the front and rear channels of one of the plurality of beam members.

20 Claims, 34 Drawing Sheets

(51) Int. Cl.
| | |
|---|---|
| *F16M 11/10* | (2006.01) |
| *F16M 11/20* | (2006.01) |
| *F16M 11/26* | (2006.01) |
| *F16M 11/28* | (2006.01) |
| *F16M 11/24* | (2006.01) |
| *A47B 97/00* | (2006.01) |

(52) U.S. Cl.
CPC ..... *F16M 11/2014* (2013.01); *F16M 11/2085* (2013.01); *F16M 11/24* (2013.01); *F16M 11/26* (2013.01); *F16M 11/28* (2013.01); *A47B 2097/003* (2013.01); *A47B 2097/005* (2013.01); *F16M 2200/048* (2013.01)

(58) Field of Classification Search
USPC .......................................... 248/917, 919, 922
See application file for complete search history.

(56) References Cited

U.S. PATENT DOCUMENTS

| | | | |
|---|---|---|---|
| 4,402,481 A | 9/1983 | Sasaki | |
| 4,645,167 A | 2/1987 | Hardwick et al. | |
| 4,950,100 A * | 8/1990 | Horgas | B23Q 1/28 248/280.11 |
| 4,998,702 A * | 3/1991 | Reuter | B23Q 1/0009 248/278.1 |
| 5,154,390 A | 10/1992 | Bain et al. | |
| 5,454,042 A | 9/1995 | Drever | |
| 5,518,083 A * | 5/1996 | Blennert | A01M 31/02 182/188 |
| 5,813,646 A | 9/1998 | Bartholomae | |
| 6,466,432 B1 | 10/2002 | Beger | |
| 7,000,878 B2 * | 2/2006 | Lin | F16M 11/08 248/276.1 |
| 7,191,992 B2 | 3/2007 | Wagner et al. | |
| 7,261,265 B2 | 8/2007 | Bums | |
| 7,264,212 B2 * | 9/2007 | Hung | F16M 11/10 248/184.1 |
| 7,434,776 B2 | 10/2008 | Dennison et al. | |
| 7,463,494 B2 | 12/2008 | Downing et al. | |
| 7,510,154 B2 | 3/2009 | Oddsen, Jr. et al. | |
| 7,522,408 B2 * | 4/2009 | Wang | G06F 1/1601 248/917 |
| 7,529,083 B2 * | 5/2009 | Jeong | F16M 11/105 248/917 |
| 7,748,666 B2 | 7/2010 | Oddsen, Jr. et al. | |
| 7,806,236 B2 | 10/2010 | Scholen et al. | |
| 7,823,583 B2 | 11/2010 | Allen et al. | |
| 7,857,270 B2 * | 12/2010 | Short | F16M 11/2014 248/284.1 |
| 7,921,489 B2 | 4/2011 | Newkirk et al. | |
| 7,997,550 B2 | 8/2011 | Kuhn | |
| 8,000,090 B2 | 8/2011 | Moscovitch | |
| 8,050,022 B2 | 11/2011 | McIntyre | |
| 8,091,716 B2 | 1/2012 | Bair | |
| 8,230,863 B2 | 7/2012 | Ravikumar et al. | |
| 8,282,052 B2 * | 10/2012 | Huang | F16M 11/045 248/125.1 |
| 8,333,479 B2 | 12/2012 | Englander | |
| 8,336,839 B2 | 12/2012 | Boccoleri et al. | |
| 8,424,833 B2 | 4/2013 | Muller et al. | |
| 2003/0015632 A1 | 1/2003 | Dunn et al. | |
| 2005/0258319 A1 | 11/2005 | Jeong | |
| 2006/0065795 A1 | 3/2006 | Blackburn | |
| 2006/0186281 A1 * | 8/2006 | Thiessen | B25H 1/0021 248/123.11 |
| 2006/0261228 A1 * | 11/2006 | Hung | F16M 11/10 248/282.1 |
| 2007/0102607 A1 * | 5/2007 | Koh | F16M 11/10 248/276.1 |
| 2007/0170325 A1 * | 7/2007 | Ryu | F16M 11/08 248/276.1 |
| 2007/0205340 A1 | 9/2007 | Jung | |
| 2007/0237572 A1 * | 10/2007 | Thiessen | B25H 1/0021 403/96 |
| 2007/0278371 A1 * | 12/2007 | Wang | B60R 11/00 248/309.3 |
| 2008/0006751 A1 * | 1/2008 | Chen | F16M 11/10 248/278.1 |
| 2008/0011924 A1 * | 1/2008 | Li | F16M 11/10 248/309.1 |
| 2008/0117578 A1 | 5/2008 | Moscovitch | |
| 2008/0173774 A1 | 7/2008 | Saez et al. | |
| 2008/0272251 A1 | 11/2008 | Brown et al. | |
| 2008/0316689 A1 | 12/2008 | Moscovitch | |
| 2009/0114781 A1 | 5/2009 | McAnulty | |
| 2009/0173847 A1 | 7/2009 | Dittmer et al. | |
| 2010/0001153 A1 * | 1/2010 | Stenhouse | F16M 11/10 248/222.13 |
| 2010/0128423 A1 | 5/2010 | Moscovitch | |
| 2010/0172072 A1 | 7/2010 | Monaco | |
| 2010/0218344 A1 | 9/2010 | Van Gennep | |
| 2011/0108688 A1 * | 5/2011 | Parruck | F16M 11/045 248/217.4 |
| 2012/0267497 A1 * | 10/2012 | Bowman | F16M 11/10 248/280.11 |
| 2013/0119219 A1 | 5/2013 | Mifsud et al. | |
| 2015/0131217 A1 | 5/2015 | Brandt | |

FOREIGN PATENT DOCUMENTS

| | | |
|---|---|---|
| DE | 202011000355 U1 | 6/2011 |
| EP | 1769187 A1 | 4/2007 |
| WO | 2001035196 A1 | 5/2001 |
| WO | 2009151760 A1 | 12/2009 |
| WO | 2013165562 A1 | 11/2013 |

OTHER PUBLICATIONS

European Patent Office, The International Search Report and the Written Opinion of the International Searching Authority, dated Apr. 23, 2015, for PCT/US14/68914.

ErgoTech Model 100 DeskStands Product Brochure; retrieved from www.ergotechgroup.com on Jul. 23, 2013.

ErgoTech Model 600 ApexStands Product Brochure; retrieved from www.ergotechgroup.com on May 30, 2013.

* cited by examiner

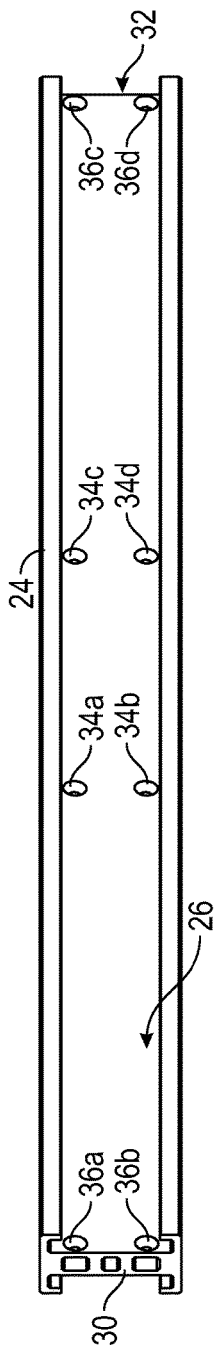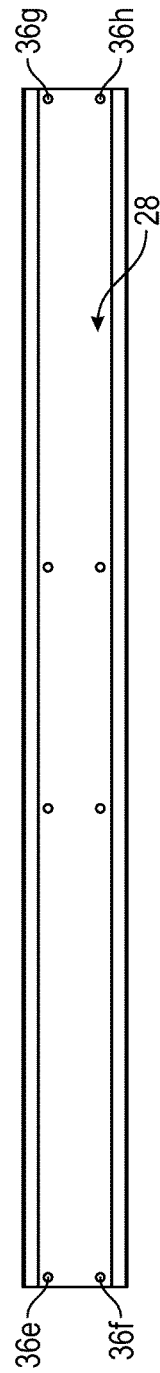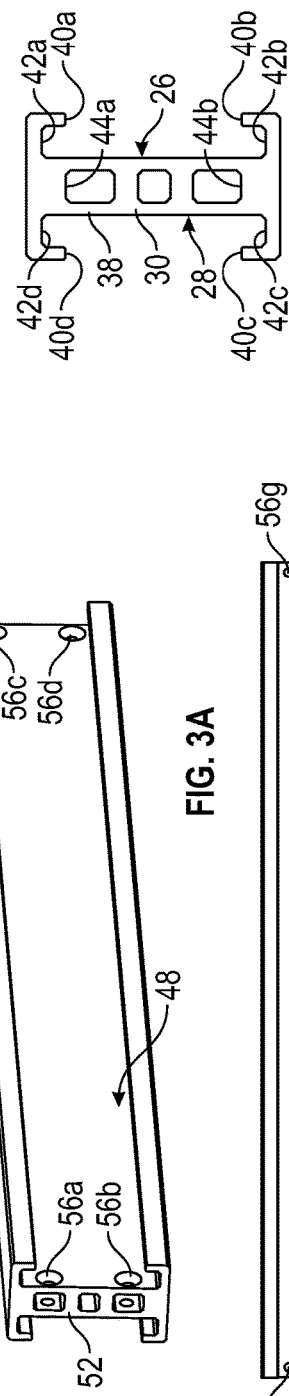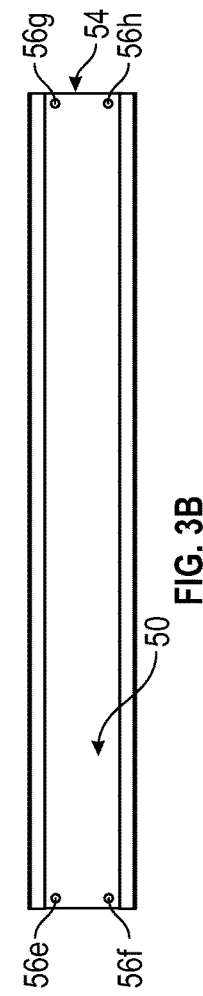

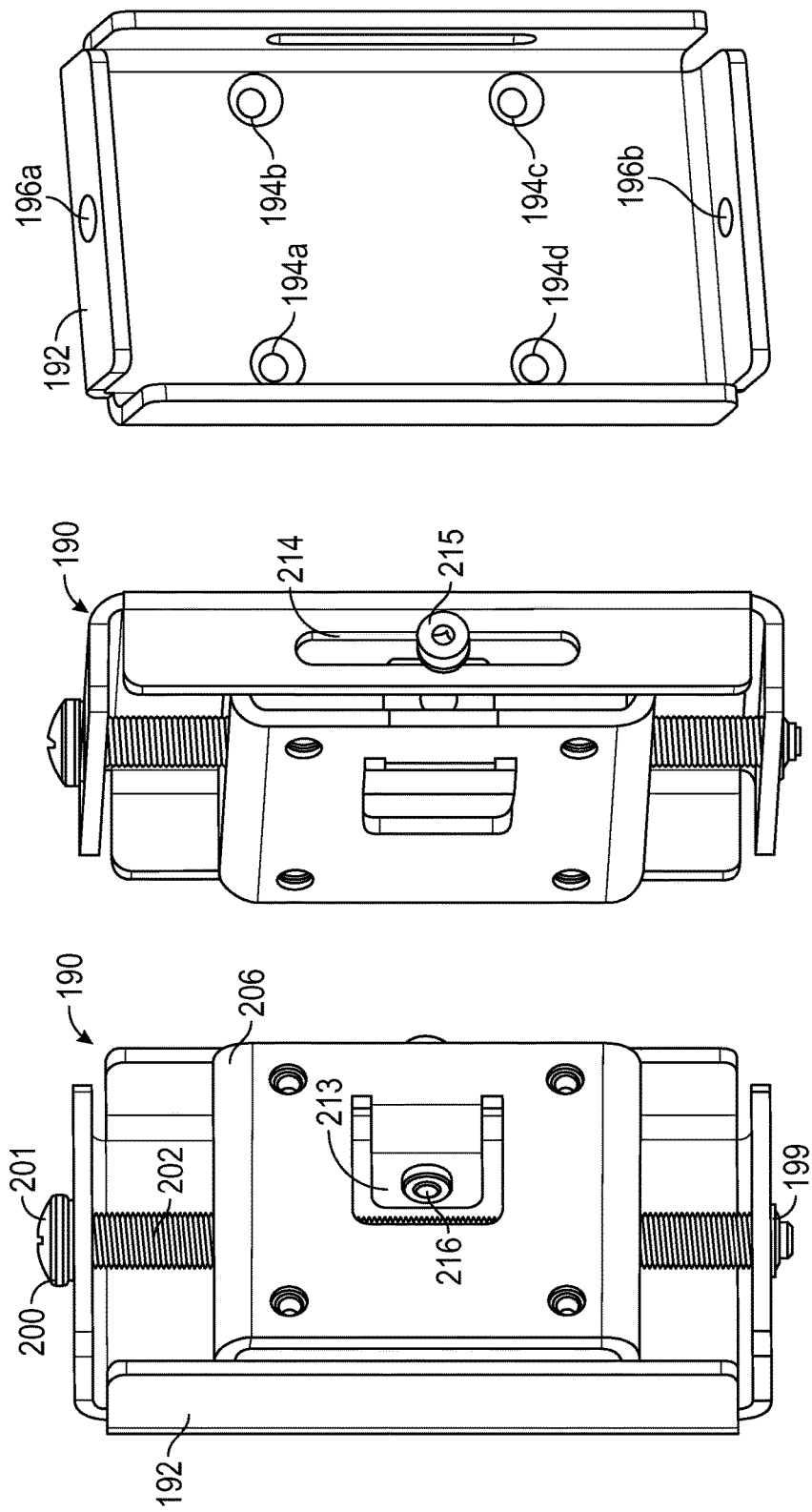

EXPANDABLE MULTI-DISPLAY SUPPORT APPARATUS

FIELD OF THE INVENTION

The present invention relates to apparatuses for supporting display devices, more particularly to an expandable or modular apparatus for supporting multiple displays.

BACKGROUND

It is increasingly common for computer users to use multiple displays (e.g., monitors) as part of their workstations. Many exiting multi-display devices are not expandable or reconfigurable in order to support a different number of displays or to support the displays in an array of different configurations.

Accordingly, there is a need for an expandable, modular multi-display apparatus that is versatile and configurable according to the wants and needs of the user.

BRIEF DESCRIPTION OF THE DRAWINGS

The expandable multi-display support apparatus according to the present invention is further described with reference to the accompanying drawings, in which:

FIG. 2A is a front perspective view of a center beam member in accordance with the present invention;

FIG. 2B is a rear view thereof;

FIG. 3A is a front perspective view of a side beam member in accordance with the present invention;

FIG. 3B is a rear view thereof;

FIG. 4 is a side view of the center beam member of FIGS. 2A and 2B;

FIGS. 31A and 31B are perspective views of an embodiment of a display support in accordance with the present invention;

FIG. 32 is a perspective view of an adjustment enclosure thereof;

ASPECTS OF THE INVENTION

Figure 1:
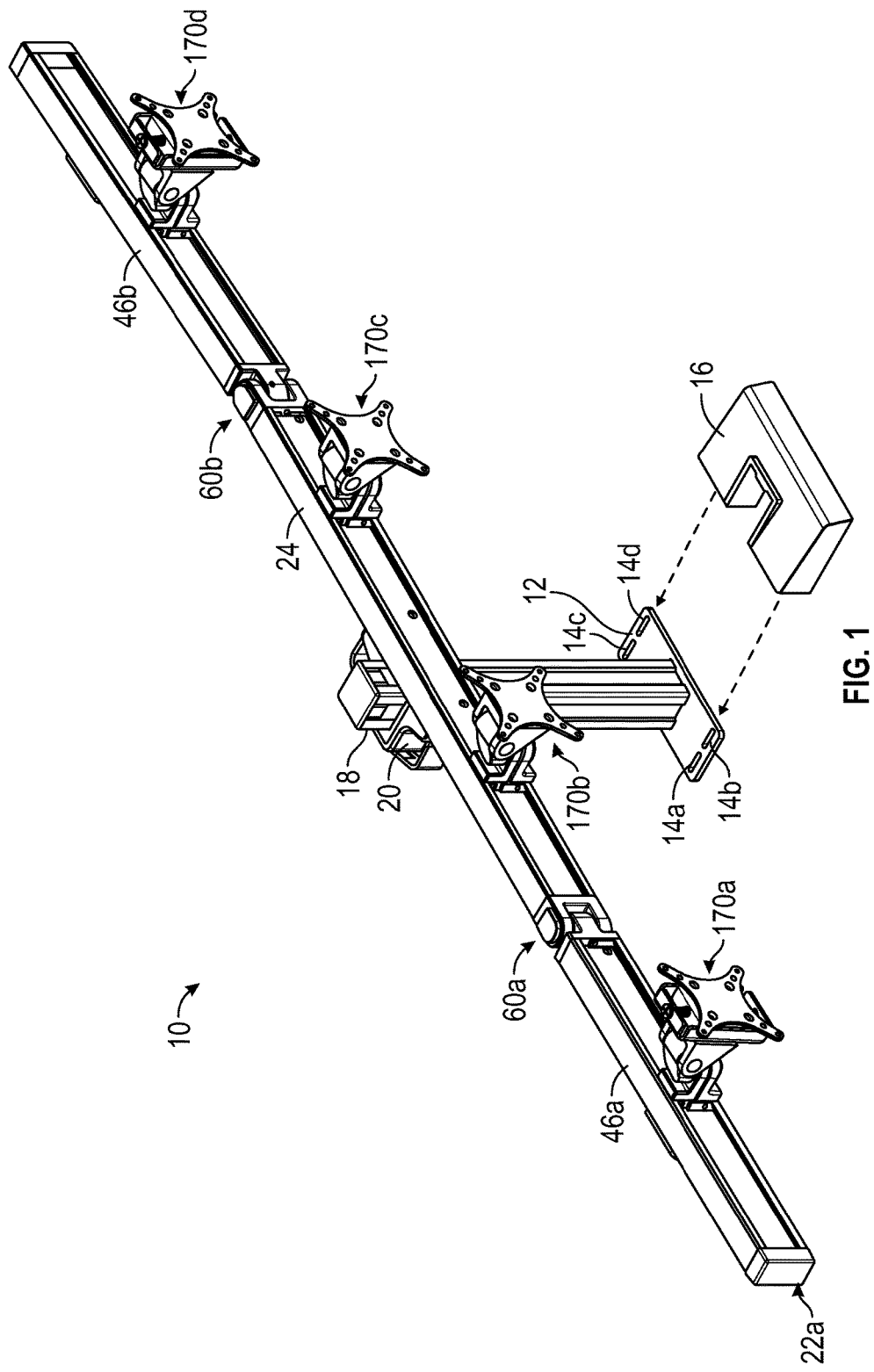
FIG. 1 is a perspective view of an embodiment of a multi-display device according to the present invention.

Additional aspects of the invention include:

Aspect 1: A modular display support device comprising a column, the column being linear and extending along a longitudinal axis; a plurality of beam members comprising a center beam member and a side beam member, each of the plurality of beam members having identical front and rear channels, each of the front and rear channels including opposing top and bottom rails; a hinge joint adapted to connect the side beam member to the center beam member and enable the side beam member to pivot about a pivot axis; a beam attachment bracket adapted to secure either of the plurality of beam members to the column; and at least one display mounting assembly comprising a pair of rail mounting brackets that mate together within one of the front and rear channels of one of the plurality of beam members and collectively engage the top and bottom rails thereof, and at least one bracket that engages the pair of rail mounting brackets and is adapted to support a display therefrom.

Aspect 2: The modular display support device of Aspect 1, wherein the opposing top and bottom rails are identical.

Aspect 3: The modular display support device of either of Aspects 1 and 2, wherein the beam attachment bracket is adapted to be secured to the column via a friction fit when the beam attachment bracket is secured to the center beam member.

Aspect 4: The modular display support device of any of Aspects 1-3, wherein the beam attachment bracket and the center beam member collectively envelope a portion of the longitudinal axis of the column when the beam attachment bracket is secured to the center beam member.

Aspect 5: The modular display support device of any of Aspects 1-4, wherein the hinge joint is secured to the center beam member and the side beam member by protrusions that extend from the hinge joint and that are secured within complementary-shaped slots formed in ends of the center beam member and side beam member.

Aspect 6: The modular display support device of any of Aspects 1-5, wherein the pivot axis is parallel to the longitudinal axis.

Aspect 7: The modular display support device of any of Aspects 1-6, wherein the display mounting assembly further includes an adapter plate having at least one set of VESA-compliant mounting holes.

Aspect 8: The modular display support device of any of Aspect 7, wherein the display mounting assembly further comprises a tilter that is adapted to enable at least two axes of rotational freedom for the adapter plate.

Aspect 9: The modular display support device of any of Aspects 1-8, wherein the front and rear channels have substantially constant cross-sectional shapes along a length of center beam member.

Aspect 10: The modular display support device of any of Aspects 1-9, wherein the column is height-adjustable.

Aspect 11: A hinge joint comprising a female hinge bracket having a rear portion, a top coupling, and a bottom coupling, the top coupling and bottom coupling collectively forming a female portion, the top coupling including a top aperture, the bottom coupling including a bottom aperture, the rear portion having two protrusions extending in a direction opposite to the female portion; a male hinge bracket having a rear portion and a protruding portion, the protruding portion including a central aperture, the rear portion having two protrusions extending in a direction opposite to the protruding portion, the female portion of the female hinge bracket and the protruding portion of the male hinge bracket being of complementary shape; a hinge pin having a head, a locking portion, and a shaft, the head having a perimeter that is larger than the top aperture, the head being located atop the locking portion and the shaft, the locking portion extending laterally from the shaft, the shaft having a length that is greater than the length of the locking portion; a top bushing having a first portion located within the central aperture and between the central aperture and the shaft when the hinge joint is fully assembled and a second portion located above the central aperture and between the protruding portion and the top coupling when the hinge joint is fully assembled; and a bottom bushing having a first portion located within the central aperture and between the central aperture and the shaft when the hinge joint is fully assembled and a second portion located below the central aperture and between the protruding portion and the bottom coupling when the hinge joint is fully assembled.

Aspect 12: The hinge joint of Aspect 11, the top aperture having a top aperture depth, wherein when the hinge joint is fully assembled the locking portion extends downwardly from the head a distance that is no greater than the top aperture depth.

Aspect 13: The hinge joint of either of Aspects 11 and 12, further comprising a washer having a disc portion and at least one protrusion extending from the disc portion, the at least one protrusion being shaped and positioned to engage at least one slot located in a bottom surface of the shaft and prevent rotation of the shaft relative to the disc portion.

Aspect 14: The hinge joint of any of Aspects 11-13, wherein the central and bottom apertures have circular cross-sectional shapes.

Aspect 15: The hinge joint of any of Aspects 11-14, wherein the locking portion and the shaft aggregately have a non-circular cross-sectional shape that is complementary to the cross-sectional shape of the top aperture.

Aspect 16: A method of pivoting a side beam member of a display support device comprising a center beam member that is affixed to a column, the method comprising: (a) providing a hinge joint having a female hinge bracket that is attached to the center beam member, a male hinge bracket that is attached to the side beam member, and a hinge pin having a shaft that extends through a top aperture in the female hinge bracket, a bottom aperture in the female hinge bracket, and a central aperture in the male hinge bracket that is aligned with and positioned between the top and bottom apertures, the shaft having a longitudinal axis; (b) rotating the male hinge joint and the side beam member about the longitudinal axis; and (c) preventing rotation of the hinge pin while performing step (b).

Aspect 17: The method of Aspect 16, wherein step (a) further comprises providing the hinge pin with a locking portion located near the top end of the shaft and providing the top aperture with a non-circular cross-sectional shape, the locking portion and top end of the shaft having an aggregate cross-sectional shape that is complementary to the cross-sectional shape of the top aperture.

Aspect 18: A display support device comprising: a beam member attached to a column, the beam member having a first end, a second end opposing the first end, a first face, and a second face opposing the first face, both of the first end and the second end having at least one attachment slot therein, the first face and second faces being identical and having identical top and bottom rails along a length of the beam member, the length of the beam member being measured between the first and second ends; and a first bracket having a protruding portion and a coupling, the protruding portion having a cross-sectional shape that complements a cross-sectional shape of the at least one attachment slot located in the first and second ends, the protruding portion being directly attachable to the at least one attachment slot of both the first and second ends, the first bracket being attachable via a second bracket to at least one of the top and bottom rails of both the front side and the rear side, the second bracket having an attachment slot having a cross-sectional shape that complements the cross-sectional shape of the protruding portion.

DETAILED DESCRIPTION OF THE PREFERRED EMBODIMENTS

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It is understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

The present application incorporates by reference the entire contents of U.S. Provisional Application No. 61/912,418, filed Dec. 5, 2013 and U.S. Provisional Application No. 62/009,325, filed Jun. 8, 2014 as if the contents thereof were set forth herein in their entireties.

It is now common for computer users to simultaneously use multiple displays at their workstations. Because different users have different wants and needs with respect to their display configuration, it is desirable to have an expandable, modular apparatus for supporting multiple displays that is highly configurable to support two or more displays in a great variety of different configurations, without the need for a large amount of unique parts. The invention taught in the present application provides a solution to this need by including parts that are versatile and configurable into a great variety of different configurations, as needed by a particular user. The multi-display device in accordance with the present invention is also easily expandable, should a user later desire to add one or more additional displays to their workstation.

FIGS. 1-42 generally show embodiments and configurations of a multi-display device in accordance with the present invention. In FIG. 1, one embodiment of a multi-display device 10 is shown. In this embodiment, the device 10 comprises a base plate 12 including four base plate mounting holes 14a-14d that are used to mount the base plate 12 to a support surface (not shown) via base mounting bolts 13a-13d (see FIG. 23), a column 18 that extends from the base plate 12, a support beam row 22a, and an attachment bracket 20 that attaches the support beam row 22a to the column 18. A base plate cover 16 may optionally be used to cover the base plate 12 after it has been attached to a support surface, for aesthetic purposes and to protect electrical components, if applicable.

In the embodiment of FIG. 1, the support beam row 22a comprises a center beam member 24, a first side beam member 46a, and a second side beam member 46b. The side beam member 46a is attached to the center beam member 24 via a hinge joint 60a, and the side beam member 46b is attached to the center beam member 24 via a hinge joint 60b. In this embodiment, display support 170a is attached to the side beam member 46a, display supports 170b,170c are attached to the center beam member 24, and display support 170d is attached to the side beam member 46b. In alternate embodiments, a greater or lesser number of display supports could be attached to the center beam member and/or side beam members 46a,46b in the configuration shown in FIG. 1, according to the needs and desires of the user and the size and configuration of the displays that are to be attached to the display supports.

Figure 22:
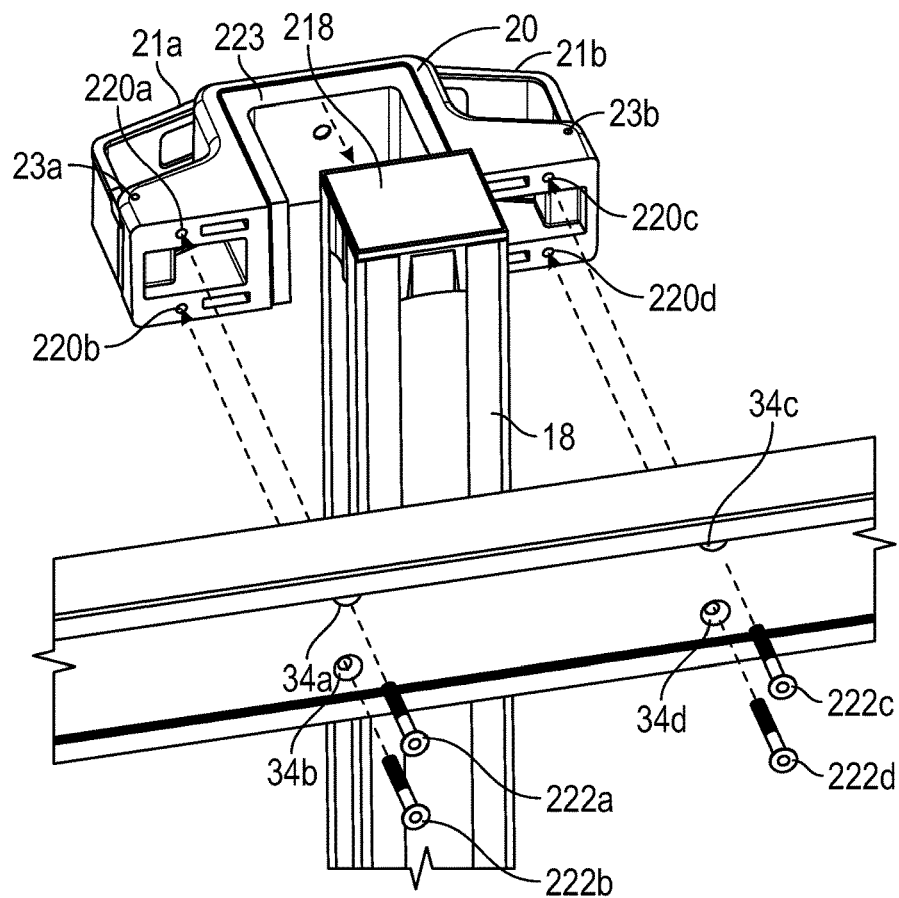
FIG. 22 is a partial exploded view showing how a beam member attaches to a support column in accordance with the present invention.

FIGS. 2A and 2B show the center beam member 24. In this embodiment, the center beam member 24 comprises a first or front side 26, a second or rear side 28, a first end 30, and a second end 32. Attachment bracket mounting holes 34a-34d are located in the center beam member 24 and are used to attach the center beam member 24 to the attachment bracket 20, which acts to clamp the center beam member 24 to the column 18, as best seen in FIG. 22. Beam extension mounting holes 36a-36h are located at the ends 30,32 of the center beam member 24, which permit the center beam member 24 to be attached to other parts of the device 10, as will be further described below in detail.

FIGS. 3A and 3B show the side beam member 46a. It should be understood that the side beam member 46b is identical to the side beam member 46a, and that discussion in this application with respect to side beam member 46a is equally applicable to side beam member 46b. In this embodiment, the side beam member 46a comprises a first or front side 48, a second or rear side 50, a first end 52, and a second end 54. Beam extension mounting holes 56a-56h are located at the ends 52,54 of the side beam member 46a, which permit the side beam member 46a to be attached to other parts of the device 10, as will be further described below in detail.

In this embodiment, the center beam member 24 is of greater length than the side beam members 46a,46b. In one embodiment, the center beam member 24 is 30 inches long and the side beam members 46a,46b are 20 inches long. In alternate embodiments, beam members of various lengths may be made available, so that the user can customize their multi-display device 10 according to their particular needs or desires. For example, beam members of 6 inch, 12 inch, 18 inch, 24 inch, 30 inch, 36 inch, 48 inch, 54 inch, 60 inch, and/or other lengths could be made available to the user. In alternate embodiments, the side beam member 46a could include mounting holes located in a center portion thereof, so that the side beam member 46a could be mounted at said center portion directly to, for example, the column 18.

FIG. 4 is a side view of the center beam member 24, showing the cross-sectional profile 38 of the center beam member 24. It should be understood that the side beam members 46a,46b have an identical cross-sectional profile—in both shape and dimensions—to the cross-sectional profile 38 of the center beam member 24. The center beam member 24 has rails 40a,40b located on the front side 26 thereof that define respective slots 42a,42b and rails 40c,40d located on the rear side 28 thereof that define respective slots 42c,42d. The center beam member 24 also includes tab attachment slots 44a,44b located through the first end 30 thereof. In this embodiment, the tab attachment slots 44a,44b extend the entire length of the center beam member 24 and extend through the second end 32. In alternate embodiments, the tab attachment slots 44a,44b need not extend along the entire length of the center beam member 24. The purpose of these slots 44a,44b will be described in further detail below.

In this embodiment, the beam members 24,46a,46b are extruded from aluminum. In alternate embodiments, the beam members 24,46a,46b could be comprised of other suitable materials, for example other metals (e.g., steel), composites, or polymers, and could be formed via other methods, for example welding, stamping, pultruding, casting, or molding.

Figure 5:
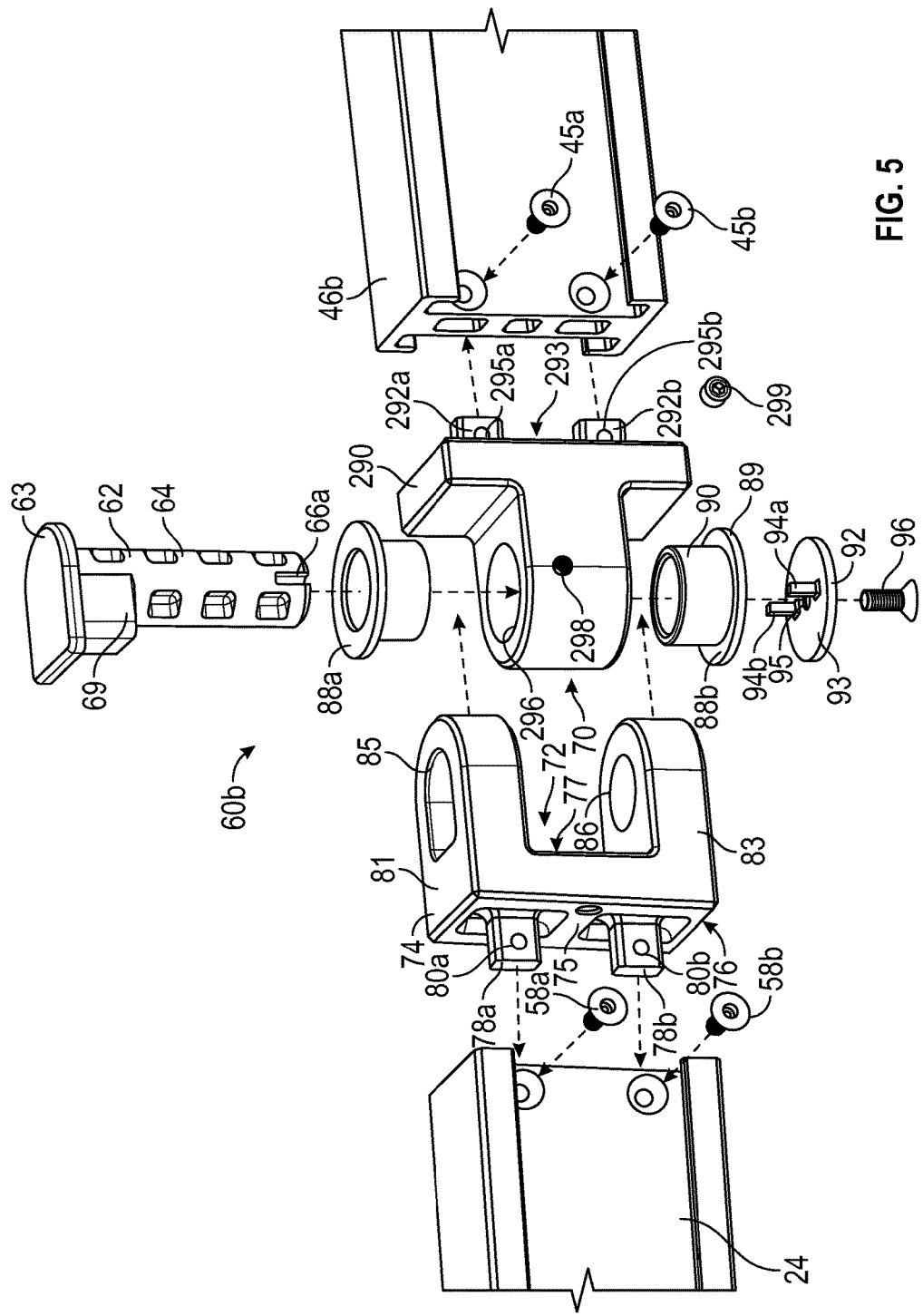
FIG. 5 is a perspective view of a hinge joint in accordance with the embodiment of FIG. 1.

FIG. 5 shows one embodiment of a hinge joint 60b in accordance with the present invention. It should be understood that hinge joint 60b is identical to hinge joint 60a. The hinge joints 60a,60b permit a hinged connection between two beam members, for example center beam member 24 and side beam member 46b, such that the user can change the angle between the two beam members according to their needs and desires. In this embodiment, the hinge joint 60b includes a hinge bracket 74 that forms the slot or female portion 72 of the hinge joint 60b, a hinge eye 290 that forms the protruding or male portion 70 of the hinge joint 60b, and a hinge pin 62 that connects the hinge eye 290 to the hinge bracket 74. The hinge pin 62 forms an axis about which the hinge joint 60b can rotate (in this embodiment, the side beam member 46b is rotatable about the axis of the hinge pin 62).

In this embodiment, the hinge joint 60b is assembled by joining the hinge bracket 74 to the end of the center beam member 24, and by joining the hinge eye 290 to the end of the side beam member 46b, and by then joining the hinge bracket 74 and hinge eye 290 together via hinge pin 62. Hinge bracket 74 has a pair of mounting tabs 78a,78b located on a rear surface 76 of a rear portion 75 thereof. The rear portion 75 also includes a front surface 77. The mounting tabs 78a,78b have threaded fastener passages 80a,80b respectively located therethrough. Mounting tabs 78a,78b are inserted into tab attachment slots 44a,44b located at the end of the center beam member 24, and beam extension fasteners 58a,58b are passed through the beam extension mounting holes 36c,36d and into the threaded fastener passages 80a,80b, thereby durably but removably attaching the hinge bracket 74 to the center beam member 24.

The hinge eye 290 has a pair of mounting tabs 292a,292b located on a rear surface 293 thereof. The mounting tabs 292a,292b have threaded fastener passages 295a,295b respectively located therethrough. Mounting tabs 292a,292b are inserted into tab attachment slots 44a,44b located at the end of the side beam member 46b, and beam extension fasteners 45a,45b are passed through the beam extension mounting holes 56a,56b and into the threaded fastener passages 295a,295b, thereby durably but removably attaching the hinge eye 290 to the side beam member 46b.

In this embodiment, the hinge pin 62 has a head 63, a shaft 64, a rotation lock 69 and a threaded fastener hole 68 and a pair of notches 66a,66b that are located at the bottom end of the shaft 64. The hinge pin 62 is securely attached within the hinge joint 60b via a dog washer 92 and a fastener 96 that are located on the opposite side of the hinge joint 60a from the head 63 of the hinge pin 62. The dog washer 92 has a disc portion 93 having a pair of tabs 94a,94b located thereon and a fastener hole 95 located therethrough. When the hinge joint 60b is assembled, the tabs 94a,94b each engage a respective one of the notches 66a,66b located at the bottom end of the shaft 64 of the hinge pin 62, and the fastener 96 is passed through the fastener hole 95 located in the disc portion 93 of the dog washer 92 and securely engaged with the threaded fastener hole 68 located at the bottom end of the shaft 64 of the hinge pin 62.

The hinge bracket 74 has a top portion 81 that extends from the rear portion 75 and includes a coupling 85 and a bottom portion 83 that extends from the rear portion 75 and includes a coupling 86. In this embodiment, the coupling 85 has a cross-sectional shape that is approximately that of an uppercase "D," and engages with the complementary-shaped rotation lock 69 of the hinge pin 62 in order to prevent the hinge pin 62 from rotating once installed. The hinge eye 290 has a coupling 296 into which is fitted a pair of bushings 88a,88b. Each bushing has a flat portion 89 that rests against an exterior surface of the hinge eye 290, and a tubiform portion 90 that fits within the coupling 296. In this embodiment the bushings 88a,88b are comprised of acetal, but in alternate embodiments bushings of other materials are suitable, including nylon, vinyl, plastics, or rubber. The bushings 88a,88b prevent direct contact between the hinge pin 62 and the couplings 85,86,296.

Because the hinge eye 290 in this embodiment is used to support the side beam members 46a,46b of the support beam row 22a, it is desirable to prevent sagging in this hinge joint 60b. Thus, friction may be added to the hinge joint 60b by tightening or loosening a set screw 299 within a set screw hole 297 in the hinge eye 290 in order to vary the amount of friction that is placed on the hinge pin 62 via interaction with the coupling 88a. Additionally, because the hinge pin 62 is rotationally fixed via the rotation lock 69, the side beam member 46b is able to rotate about the hinge pin 62 while the hinge pin 62 remains in a fixed rotational position.

In some embodiments, the thickness of the rear portion 75 of the hinge bracket 74, as measured between the rear surface 76 and the front surface 77 between the top portion 81 and the bottom portion 83, may be slightly tapered, for example by approximately 1.5 degrees, so that when weight is applied to the hinge bracket 74 via an attached side beam member 46a,46b and/or additional components, the hinge bracket 74 and attached components become level with the center beam member 24 due to the attached load. In other words, the tapering of the hinge bracket 74 prevents the side beam member 46a,46b from appearing to sag relative to the center beam member 24 once weight is loaded onto the side beam member 46a,46b.

Figure 6:
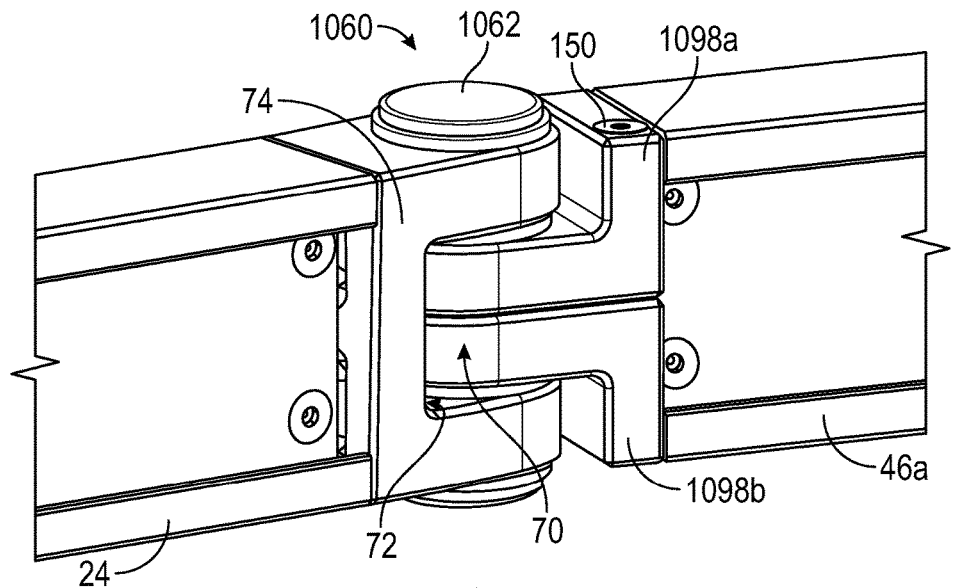
FIG. 6 is a perspective view of an alternate embodiment of a hinge joint in accordance with the present invention.
Figure 7:
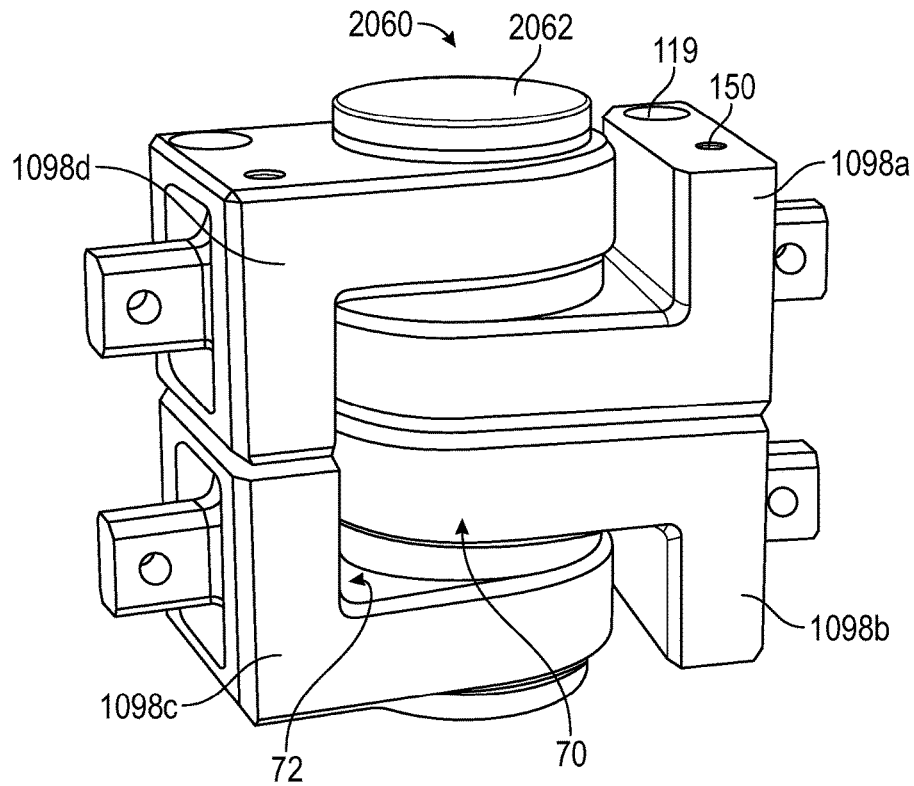
FIG. 7 is a perspective view of an alternate embodiment of a hinge joint in accordance with the present invention.

An alternate embodiment of a hinge joint 1060 is shown in FIG. 6. In this embodiment, the hinge bracket 74 of the embodiment of FIG. 5 forms the slot portion 72 of the hinge joint 1060, and a pair of arm mount cups 1098a,1098b collectively form the protruding portion 70 of the hinge joint 1060. The arm mount cups 1098a,1098b are joined together via a pair of vertically-oriented bolts 150 (only one bolt 150 is shown in FIG. 6). The side member 46a is free to rotate about the hinge pin 1062. An additional alternate embodiment of a hinge joint 2060 is shown in FIG. 7. In this embodiment, the slot or female portion 72 of the hinge joint 2060 is formed by a first pair of arm mount cups 1098c, 1098d that have been reoriented such that collectively they have a cross-sectional shape that approximates three sides of a rectangle and fixed together via a pair of vertical bolts (not shown) that are each passed through a bolt hole 119 of the respective arm mount cup, and the male or protruding portion 70 of the hinge joint 2060 is formed by a second pair of arm mount cups 1098a,1098b that have been joined together like in the embodiment of FIG. 6. The attached beam members are thus free to rotate about the hinge pin 2062. It should be understood that each of the arm mount cups 1098a-1098d are identical in this embodiment. The shape and design of the arm mount cups 1098a-1098d permit them to be joined with additional, identical arm mount cups and additional components in a variety of different configurations in order to permit the arm mount cup to serve as all or portion of a display support, beam row support, and/or hinge joint.

Figure 8A:
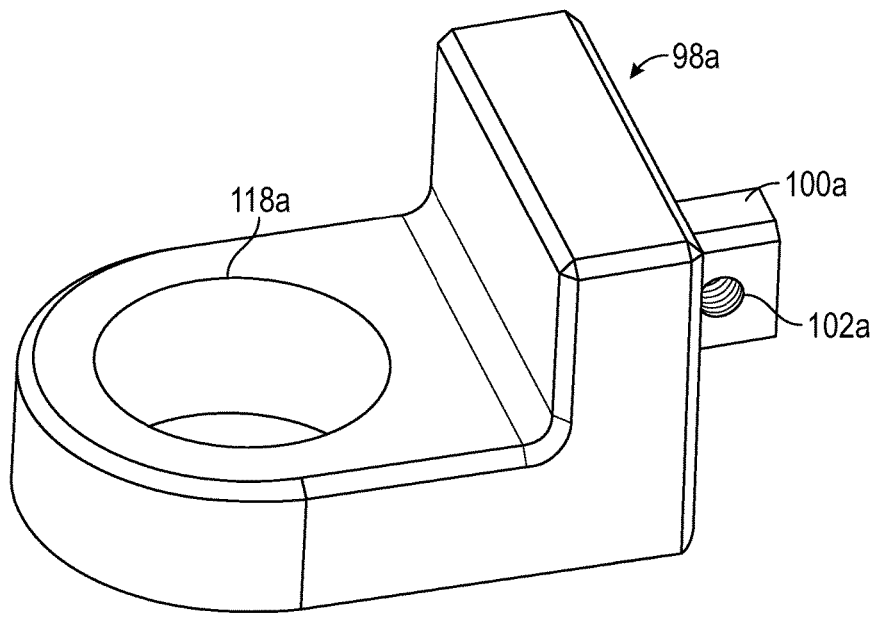
FIGS. 8A-8C are various views of an arm mount cup in accordance with the present invention.
Figure 8B:
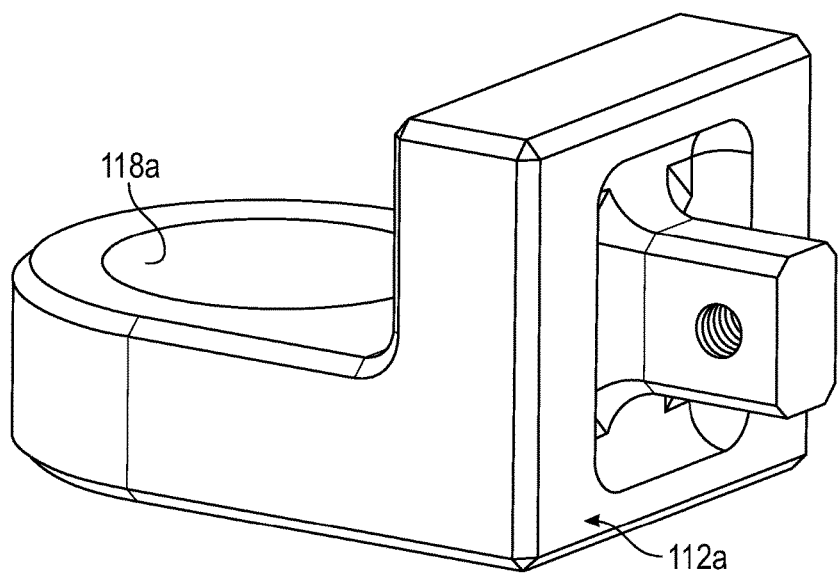
Figure 8C:
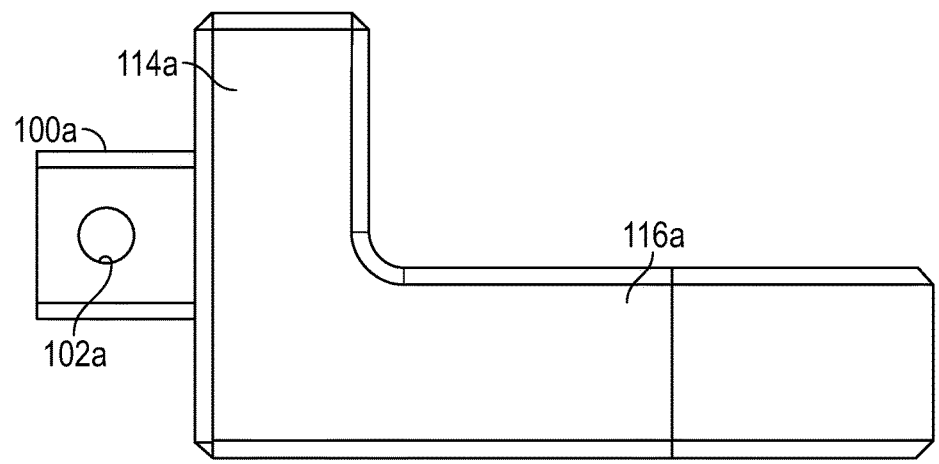

FIGS. 8A-8C show various views of one embodiment of an arm mount cup 98a. The arm mount cup 98a has a cross-sectional shape that approximates an uppercase letter "L," or two adjacent sides of a rectangle, and is comprised of a first linear portion 114a and a second linear portion 116a. The rear surface 112a of the arm mount cup 98a includes the mounting tab 100a, which has a threaded fastener passage 102a located therethrough. A coupling 118a passes through the second linear portion 116a of the arm mount cup 98a.

Figure 9:
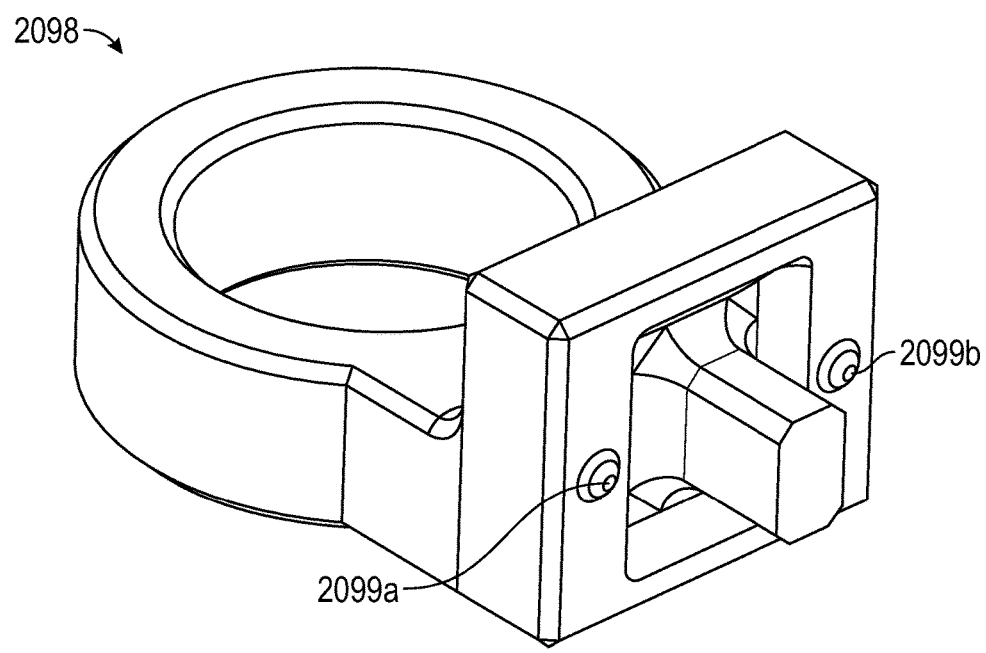
FIG. 9 is a rear perspective view of an alternate embodiment of an arm mount cup in accordance with the present invention.

FIG. 9 shows a rear perspective view of an alternate embodiment of an arm mount cup 2098. This embodiment of the arm mount cup 2098 has a pair of studs 2099a,2099b located on the rear surface thereof, and is designed for higher-load applications. As noted above, the components of the system of the present invention may be made from different materials, some of which are more capable than others of handling high-weight loads. Thus, as discussed below in further detail, the studs 2099a,2099b of the arm mount cup 2098 serve to prevent it from being used with other components of the system that are not also designed for such high-weight loads.

Figure 10:
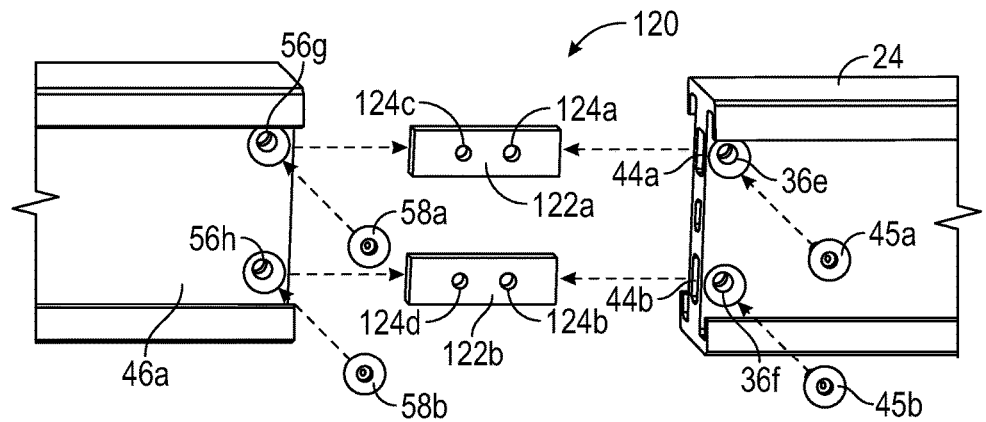
FIG. 10 is a partial exploded view of a rigid joint in accordance with the present invention.

FIG. 10 shows a partial exploded view of a rigid joint 120, wherein two beam members (e.g., beam members 24, 46a) are securely but releasably attached together in an unhinged, linear manner. Where a user desires to construct or extend a straight work rail and make it such that the beam members 24,46a may not be angled with respect to each other, they may join the beam members 24,46a together in the manner shown in FIG. 10. This modularity permits the user to extend the length of an existing support beam row by adding an additional beam member to the end of an existing beam member (see, e.g., the device 2010 of FIG. 39).

As shown in FIG. 10, the end of the center beam member 24 includes the tab attachment slots 44a,44b. In order to form the rigid joint 120, a pair of beam extension tabs 122a,122b are inserted into the tab attachment slots 44a,44b located on each of the beam members 24,46a. The beam extension tab 122a has threaded fastener holes 124a,124c located therein, and the beam extension tab 122b has threaded fastener holes 124b,124d located therein. Threaded fastener hole 124a is aligned with beam extension mounting hole 36e and beam extension fastener 45a is passed through beam extension mounting hole 36e and securely connected to threaded fastener hole 124a. Threaded fastener hole 124b is aligned with beam extension mounting hole 36f and beam extension fastener 45b is passed through beam extension mounting hole 36f and securely connected to threaded fastener hole 124b. Threaded fastener hole 124c is aligned with beam extension mounting hole 56g and beam extension fastener 58a is passed through beam extension mounting hole 56g and securely connected to threaded fastener hole 124c. Threaded fastener hole 124d is aligned with beam extension mounting hole 56h and beam extension fastener 58b is passed through beam extension mounting hole 56h and securely connected to threaded fastener hole 124d. In this way, the beam members 24,46a are securely but removably attached together to form rigid joint 120.

Figure 16A:
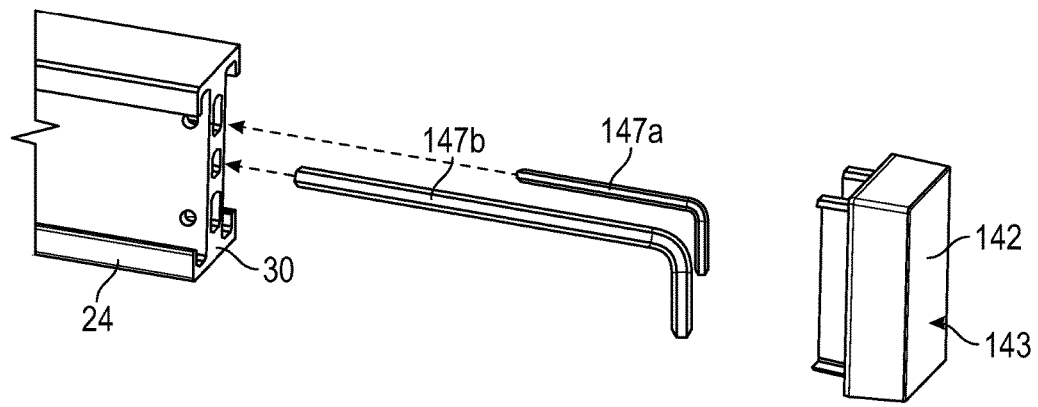
FIG. 16A is a partial exploded view showing how a beam end cover attaches to an end of a beam member in accordance with the present invention.
Figure 16B:
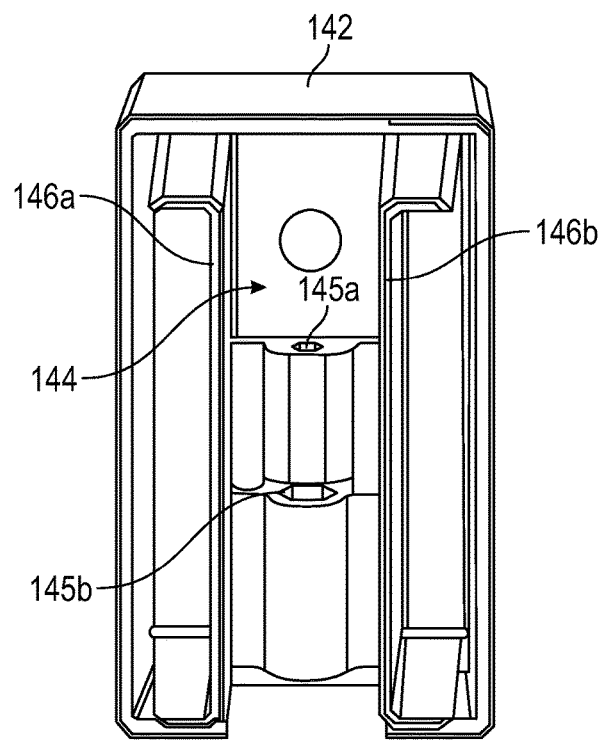
FIG. 16B is a rear perspective view of the beam end cover of FIG. 16A.

FIGS. 16A and 16B show a beam end cover 142 that can be removably attached to one of the ends of a beam member (e.g., first end 30 of center beam member 24) in order to provide an aesthetically-pleasing appearance to one or both ends of a support beam row 22a. The beam end cover 142 has a front side 143, a rear side 144, and a pair of connection members 146a,146b extending from the rear side 144. The rear side 144 includes wrench holes 145a,145b for accommodating the storage of Allen wrenches 147a,147b within the beam end cover 142 and the end 30 of the center beam member 24. The Allen wrenches, which are used to make adjustments to various components of the system, are thus conveniently stored within the device 10, yet obscured from view during ordinary use. The connection member 146a fits into the upper and lower slots located on the first side of the beam member (e.g., slots 42a,42b located on the first side 26 of the center beam member 24), and the connection member 146b fits into the upper and lower slots located on the second side of the beam member (e.g., slots 42c,42d located on the second side 28 of the center beam member 24).

Figure 11:
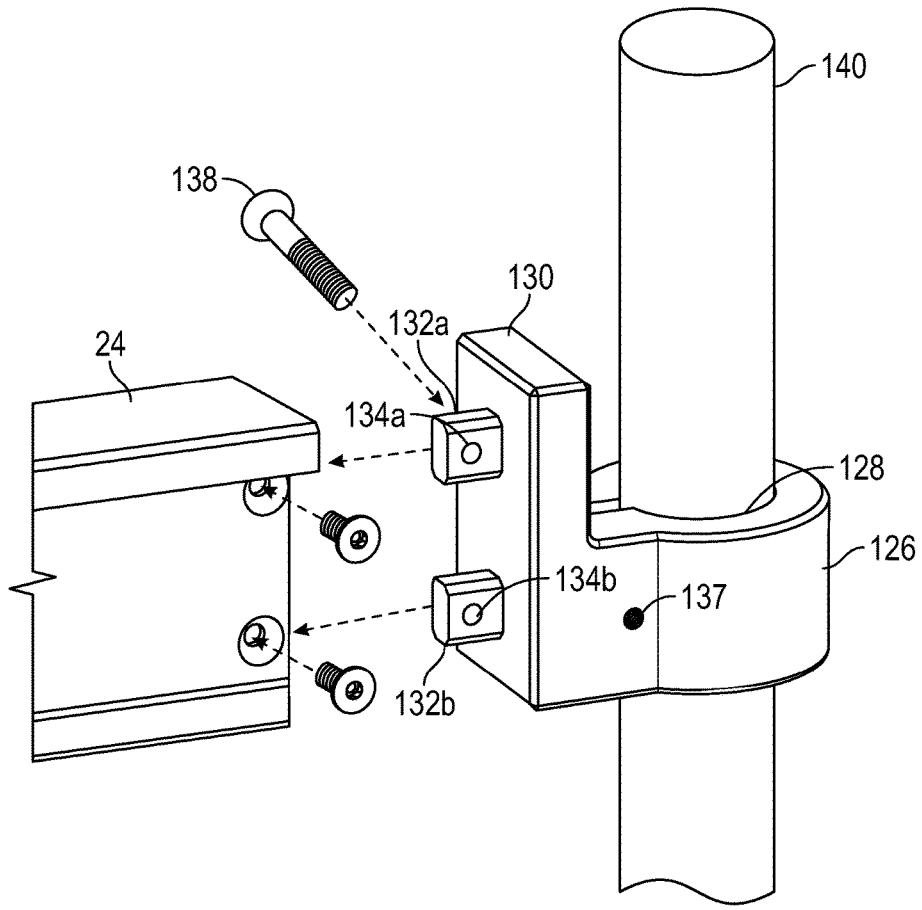
FIG. 11 is a partial exploded view showing how a pole mount bracket attaches to an end of a beam member in accordance with the present invention.
Figure 12:
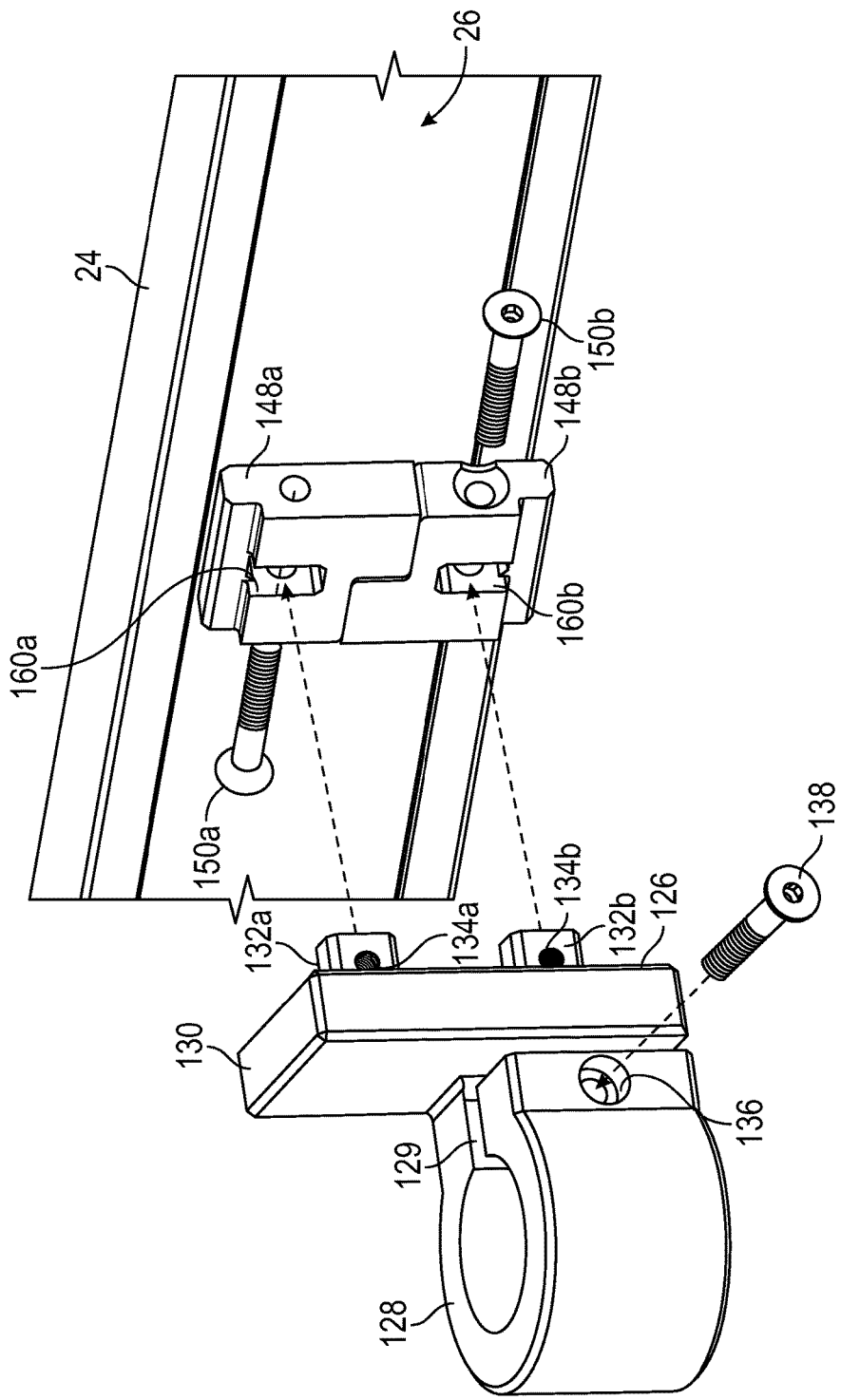
FIG. 12 is a partial exploded view showing how the pole mount bracket of FIG. 11 attaches to a side of a beam member in accordance with the present invention.

FIG. 11 shows a pole mount bracket 126 attached to an end of beam member 24. Pole mount bracket includes a coupling portion 128 that securely but releasably engages a support pole 140 and a mounting portion 130 that attaches to the beam member 24. As seen in FIG. 12, the coupling portion 128 includes a gap 129 that is narrowed or widened via a fastener 138 that is secured between fastener passages 136,137. The pole mount bracket 126 includes a mounting tab 132a having threaded fastener passage 134a and a mounting tab 132b having threaded fastener passage 134b. Mounting tabs 132a,132b are used to attach the pole mount bracket 126 to the end of the beam member 24 in an identical fashion to how hinge bracket 74 is attached to the end of the beam member 24, which is explained in detail above and incorporated by reference into this paragraph as if set forth again in its entirety.

FIG. 12 shows how the pole mount bracket 126 is mounted to the front side 26 of the center beam member 24. It should be understood that the following description is equally applicable to either of the front side or rear side of any of the beam members discussed herein, and also equally applicable to the arm mount cups 98a,98b, which include mounting tabs 100a,100b that are identical to the mounting tabs 132a,132b located on the pole mount bracket 126. In this embodiment, the pole mount bracket 126 is attached to a pair of rail mounting brackets 148a,148b, which are fitted together on the front side 26 of the center beam member 24. As shown in FIG. 17C, the rail mounting bracket 148b may be attached to the arm mount cup 98b via fastener 150b and fitted into the slot 42b, and then the rail mounting bracket 148a, which has been attached to the arm mount cup 98a via fastener 150a, may be slid into engagement with the rail mounting bracket 148b and fitted within the slot 42a. Mounting tab 100a is inserted into tab attachment slot 160a located through rail mounting bracket 148a and secured in place via fastener 150a that is routed through fastener passage 158b, threaded fastener passage 102a, and fastener passage 162a, and mounting tab 100b is inserted into tab attachment slot 160b located through rail mounting bracket 148b and secured in place via fastener 150b that is routed through fastener passage 158a, threaded fastener passage 102b, and fastener passage 162b.

Figure 13A:
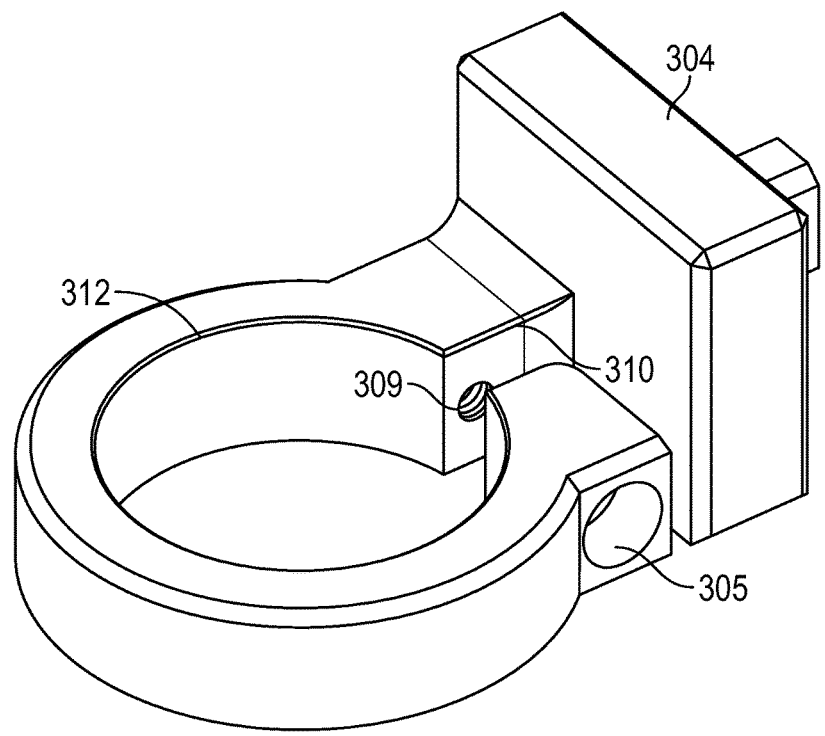
FIGS. 13A and 13B show various views of a pole mount cup in accordance with the present invention.
Figure 13B:
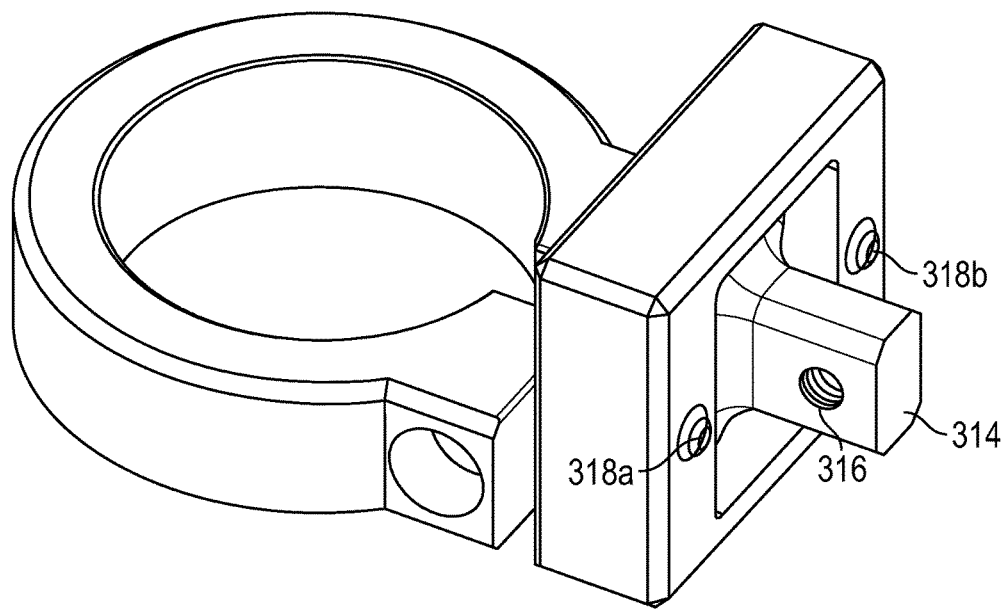

FIGS. 13A and 13b show one embodiment of a pole mount cup 304, which has a hole 305 that is aligned with a threaded fastener hole 309 across a gap 310. The pole mount cup 304 also includes a coupling 312 for receipt of a pole 140. A fastener (not shown) is passed through hole 305 and into threaded fastener hole 309, and the fastener is tightened, thereby reducing the size of the gap 310 and tightening the pole mount cup 304 against the pole 140. The pole mount cup 304 also includes a mounting tab 314 that includes a threaded fastener hole 316. The mounting tab 314 and threaded fastener hole 316 of the pole mount cup 304 is identical to those of the other components discussed above; thus the pole mount cup 304 may be used interchangeably in the present system. As shown in FIG. 13B, this embodiment of the pole mount cup 304 includes a pair of studs 318a,318b to prevent it from being used with lower-duty rail mounting brackets 148a,148b, as discussed above. In alternate embodiments of the pole mount cup 304 that are designed for lower-load applications, the studs 318a,318b may be omitted.

Figure 14:
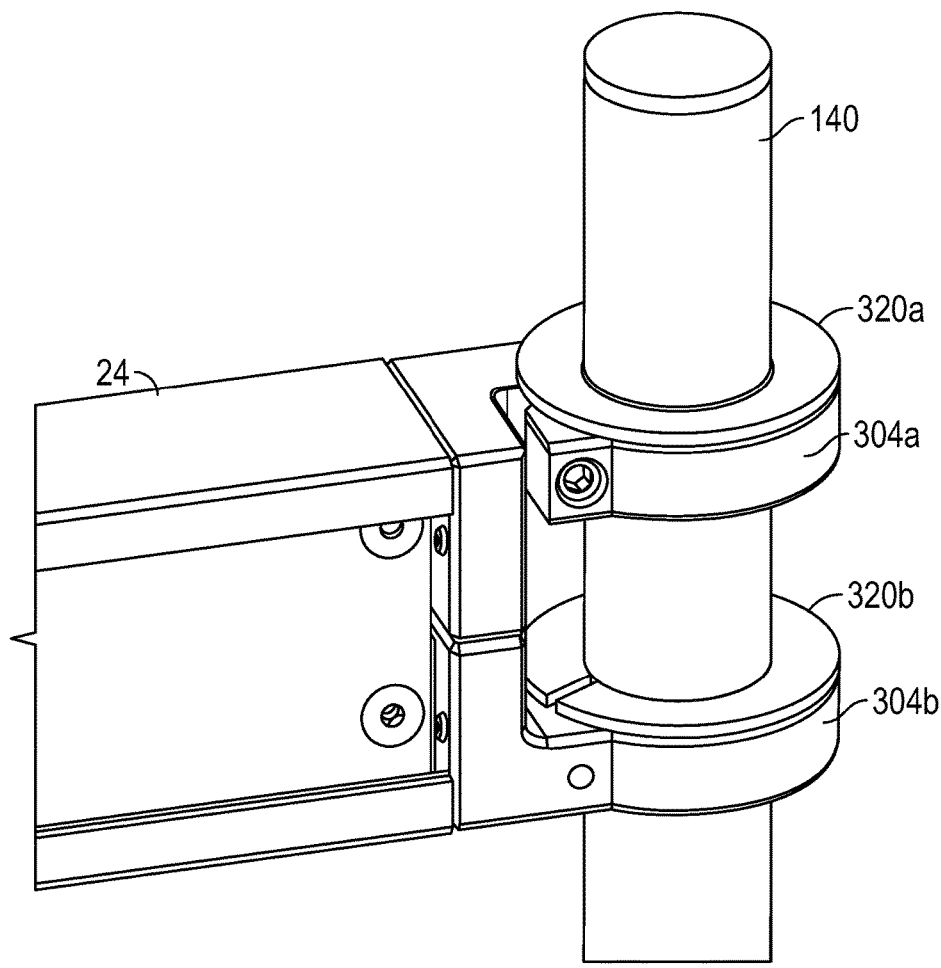
FIG. 14 is a perspective view of a rigid pole mount in accordance with the present invention.
Figure 15:
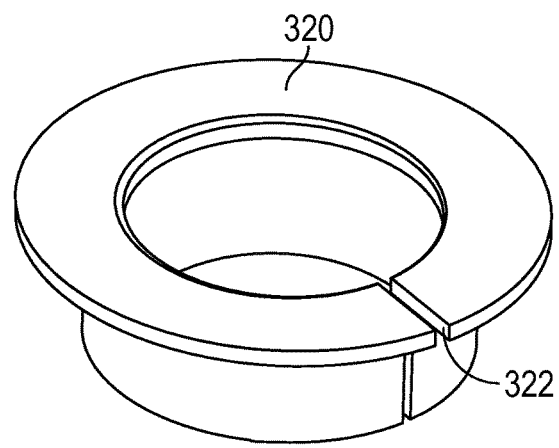
FIG. 15 is a perspective view of a pole mount bushing in accordance with the present invention.

FIG. 14 shows a center beam member 24 attached to a pair of the pole mount cups 304a,304b of FIGS. 13A and 13B, which are attached to a pole 140. A pair of pole mount bushings 320a,320b are used to prevent metal-on-metal contact between the pole 140 and the pole mount cups 304a,304b. As shown in FIG. 15, the pole mount coupling 320 is a split coupling comprising a split 322.

Figure 20A:
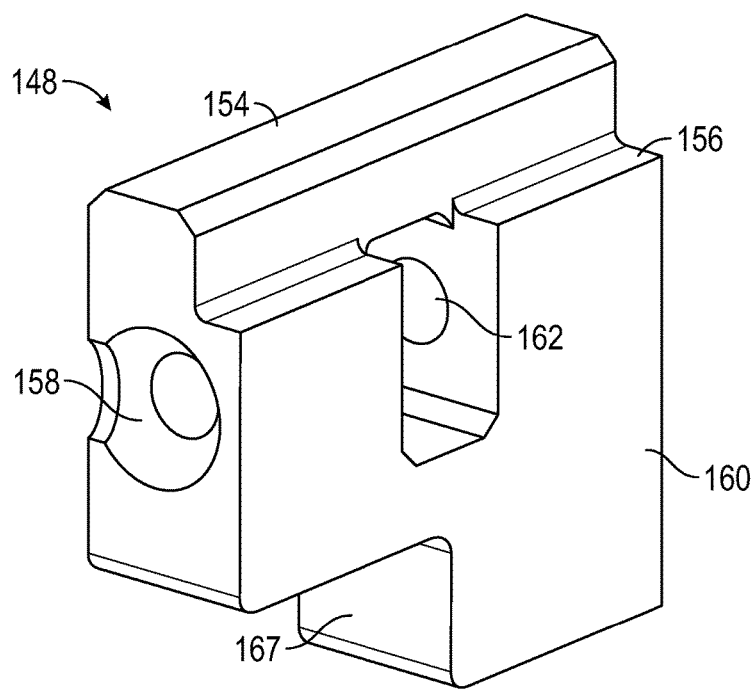
FIGS. 20A-20C are various views of a rail mounting bracket in accordance with the present invention.
Figure 20B:
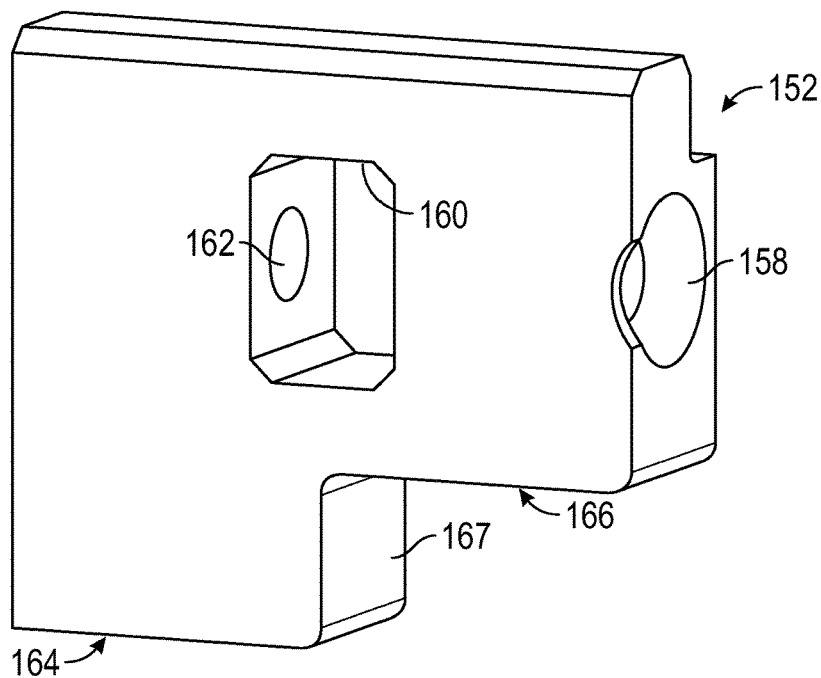
Figure 20C:
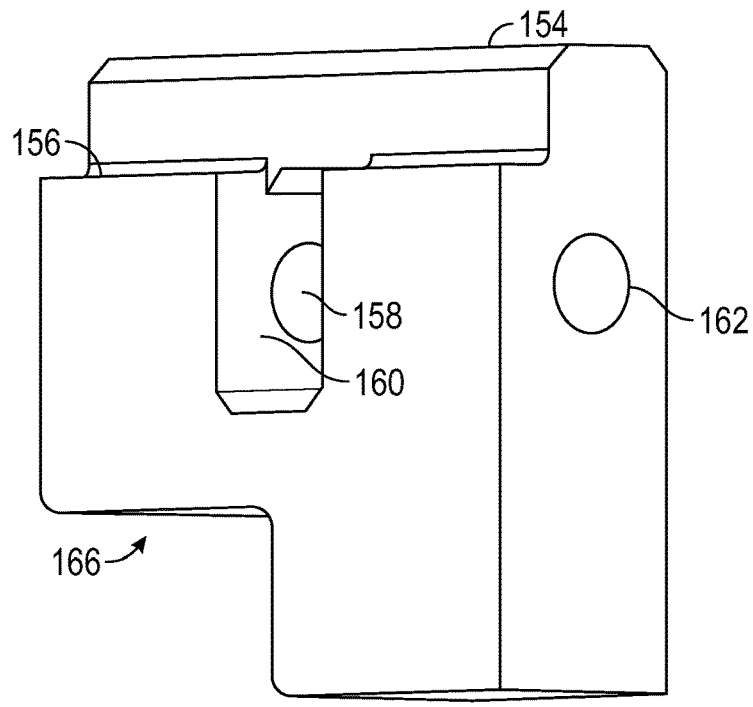

FIGS. 20A-20C show various views of a rail mounting bracket 148, which should be understood to be identical to rail mounting brackets 148a,148b. The rail mounting bracket 148 has a profile 152 that approximates an uppercase letter "P," a slot engagement portion 154 that is sized and shaped to fit within a slot of a beam member (e.g., slot 42a of the beam member 24), a rail engagement portion 156 that is sized and shaped to engage a rail of a beam member (e.g., rail 40a of the beam member 24), a tab attachment slot 160 through the body thereof, a pair of aligned fastener passages 158,162 in the body thereof, a bottom surface 164 (approximately corresponding with the base of the "P" profile), a cutout side surface 167, and a cutout bottom surface 166 (approximately corresponding with the bottom side of the circular/rectangular portion of the "P" profile). A fastener is inserted through the fastener passage 158, extends through the tab attachment slot 160, and is secured within the fastener passage 162.

Figure 21:
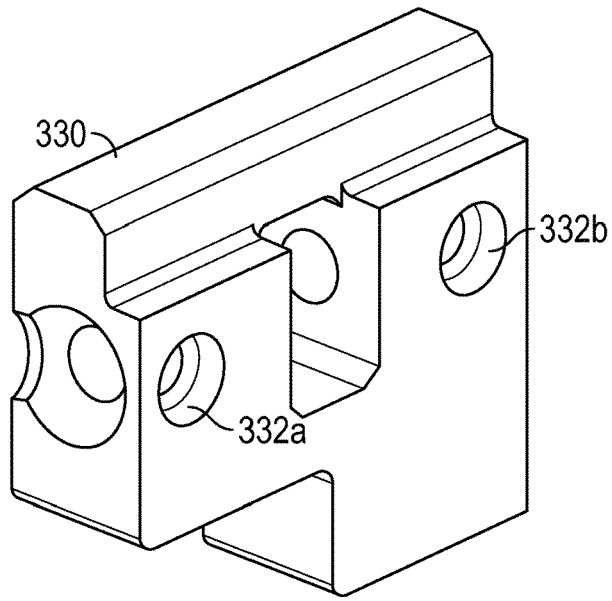
FIG. 21 is a perspective view of an alternate embodiment of a rail mounting bracket in accordance with the present invention.

FIG. 21 shows an alternate embodiment of a rail mounting bracket 330. This embodiment of the rail mounting bracket is designed for heavier-duty applications, as discussed above, and comprises a pair of stud holes 332a,332b for accommodating, e.g., the studs 318a,318b of the pole mount cup 304. The stud holes 332a,332b ensure that the heavier-duty rail mounting bracket 330 is used when the heavier-duty additional components are being utilized. The stud holes 332a,332b of the rail mounting bracket 330 will not prevent us thereof with light duty accessories that lack studs.

Figure 17A:
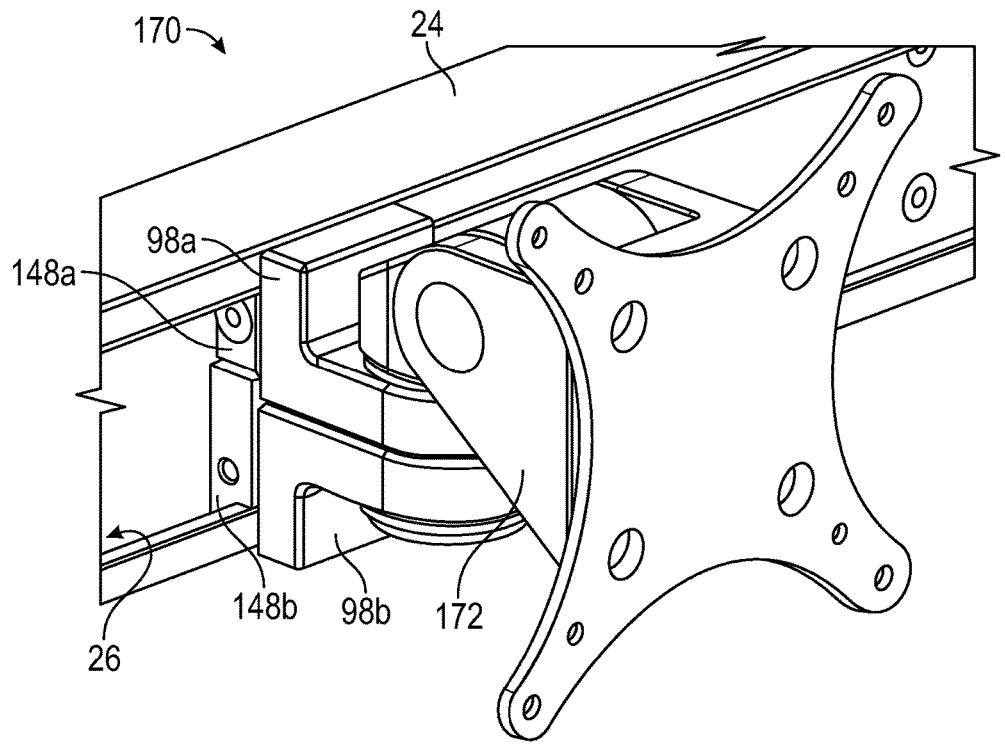
FIG. 17A is a front perspective view of a display support attached to a beam member in accordance with the present invention.
Figure 17B:
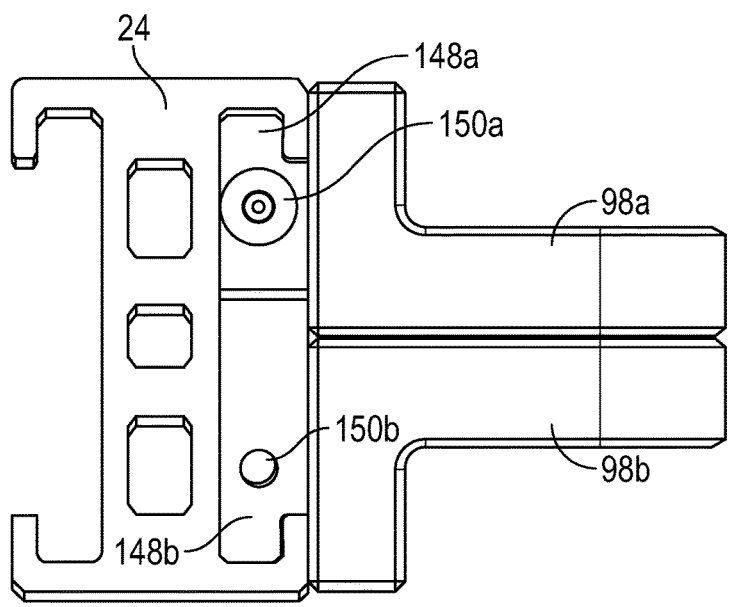
FIG. 17B is a side view thereof.
Figure 17C:
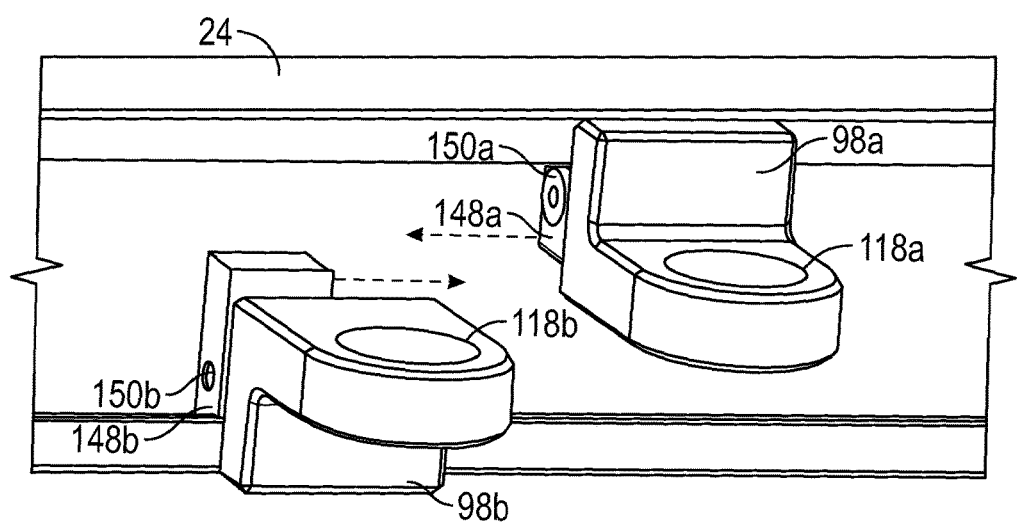
FIG. 17C is a perspective view showing how components of the display support may be attached to a beam member in accordance with the present invention.
Figure 18:
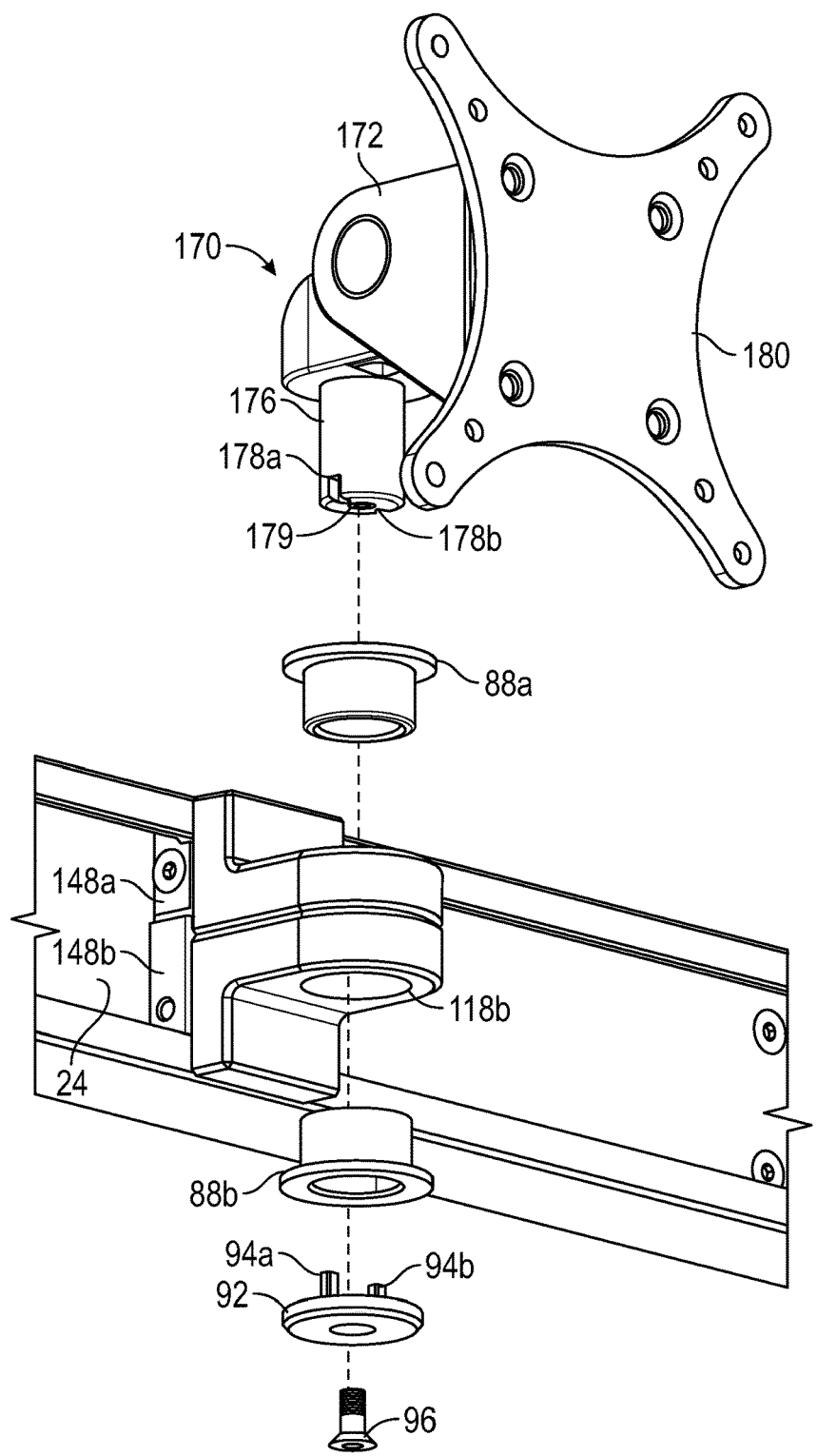
FIG. 18 is a partial exploded view showing how the display support attaches to a side of the beam member in accordance with the present invention.
Figure 19:
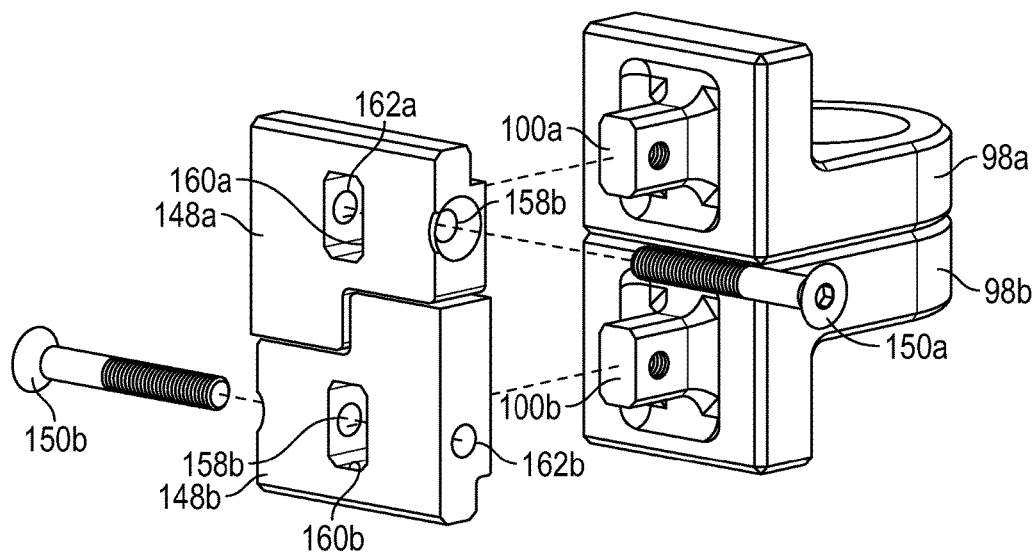
FIG. 19 is a partial exploded view of a display support in accordance with the present invention.

As shown in FIGS. 17A-18, the arm mount cups 98a,98b may be secured to the rail mounting brackets 148a,148b and used to support a tilter 172 therefrom, thereby forming a display support 170 for supporting a display therefrom that is connectable to either side of a beam member (e.g., front side 26 of center beam member 24). In alternate embodiments according to the present invention, the arm mount cups 98a,98b can be directly connected to one of the ends of a beam member (e.g., first end 30 of center beam member 24) in the same fashion as described above with respect to the connections of the hinge joint 60a, and can thereby form a display support 170 that extends from said end of said beam member.

As seen in FIG. 18, the tilter 172 includes an adapter plate 180 that is used to attach a display to the tilter 172 and a tilter shaft 176 including a pair of notches 178a,178b and a threaded fastener hole 179 located at the bottom end thereof. Each of the notches 178a,178b is sized and shaped to engage with either of the tabs 94a,94b located on the dog washer 92, and the fastener 96 is passed through the fastener hole 95 located in the dog washer 92 and securely but removably attached to the threaded fastener hole 179 located in the bottom end of the tilter shaft 176 in order to fully assemble the display support 170. Bushing 88a is inserted into coupling 118a and bushing 88b is inserted into coupling 118b, and the bushings 88a,88b prevent the tilter shaft 176 from directly contacting the couplings 118a,118b.

Referring now to FIGS. 22-30, several embodiments of the connection between the beam member 24 and the column 18 (which in some embodiments is a height-adjustable lift column) will be described in detail. In FIG. 22, the center beam member 24 is shown attached to the column 18 via the attachment bracket 20. Specifically, each of a plurality of bracket fasteners 222a-222d is passed through a respective one of the attachment bracket mounting holes 34a-34d located in the center beam member 24 and connected to a respective bracket fastener hole 220a-220d located in the attachment bracket 20, thereby securely clamping the attachment bracket 20 and center beam member 24 (which forms part of a support beam row 22a) to the column 18. In this embodiment, a column cover 218 is located over the top end of the column 18 for aesthetic purposes. The attachment bracket 20 comprises a pair of cable routers 21a,21b through which device cables may be routed. In this embodiment, the cable routers are each rotatedly connected to the attachment bracket 20 via a respective pin 23a,23b.

In the embodiment of FIG. 22, the beam member 24 is attached to an inner extrusion 242, which comprises the column 18. Because the inner extrusion 242 is of a smaller cross-sectional area than the outer extrusion 226, a column spacer 223 is used to fill the remaining space in the opening of the attachment bracket 20. If the beam member is being attached to a column 18 that includes an outer extrusion 226, the column spacer 223 would be omitted from the attachment bracket 20.

Figure 23:
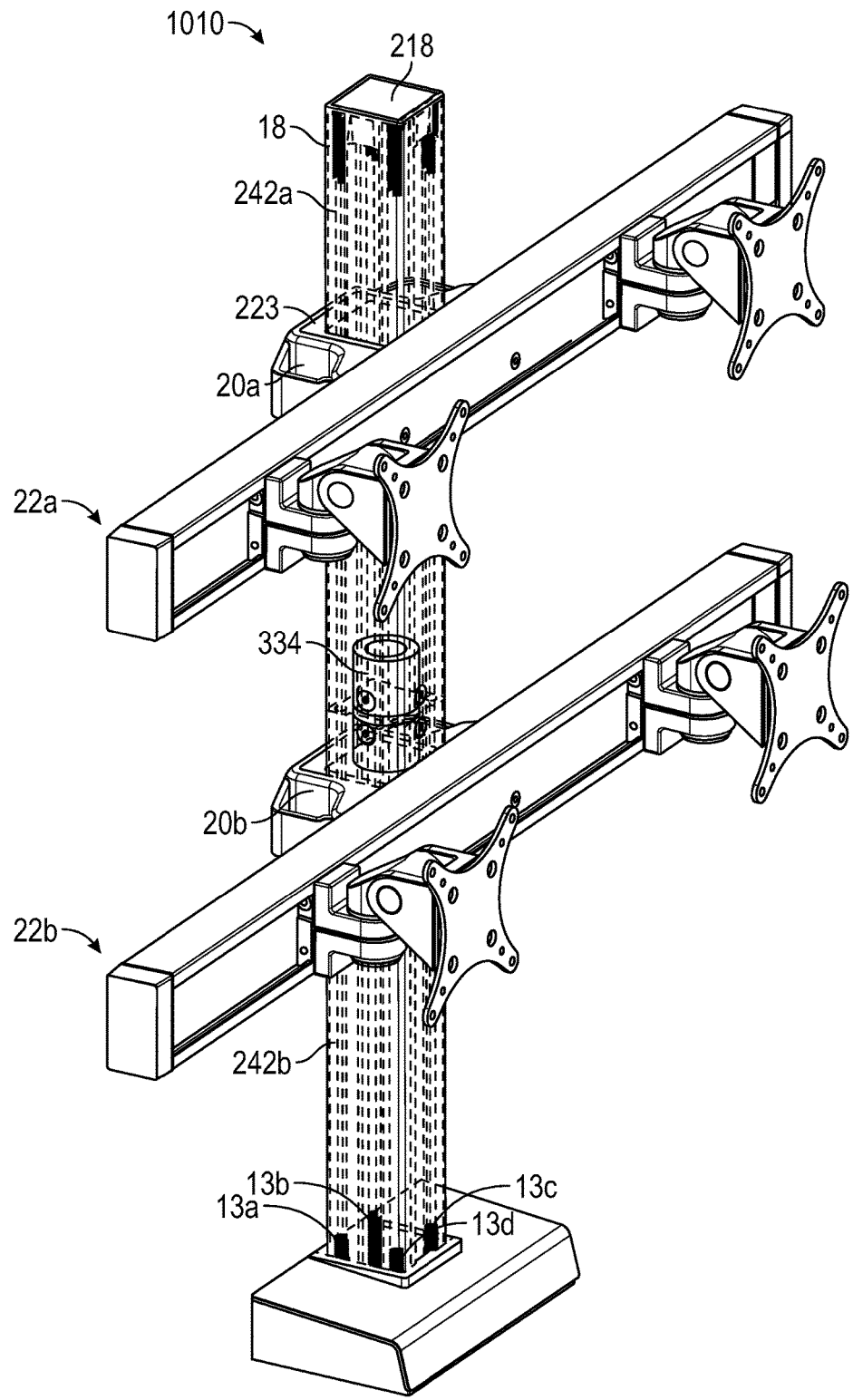
FIG. 23 is a perspective view of an embodiment of a multi-display device according to the present invention.
Figure 24:
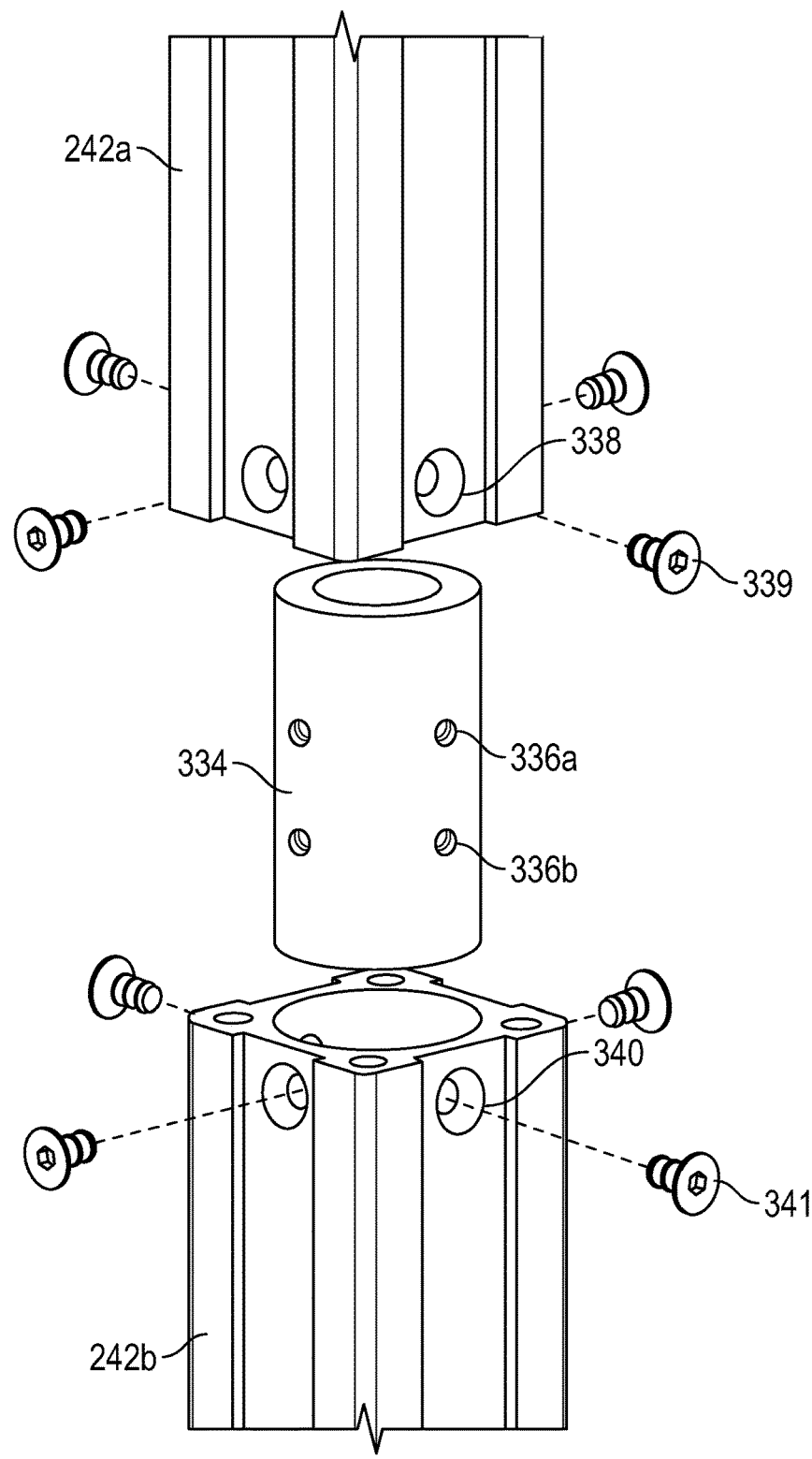
FIG. 24 is an exploded view of a portion thereof.
Figure 25:
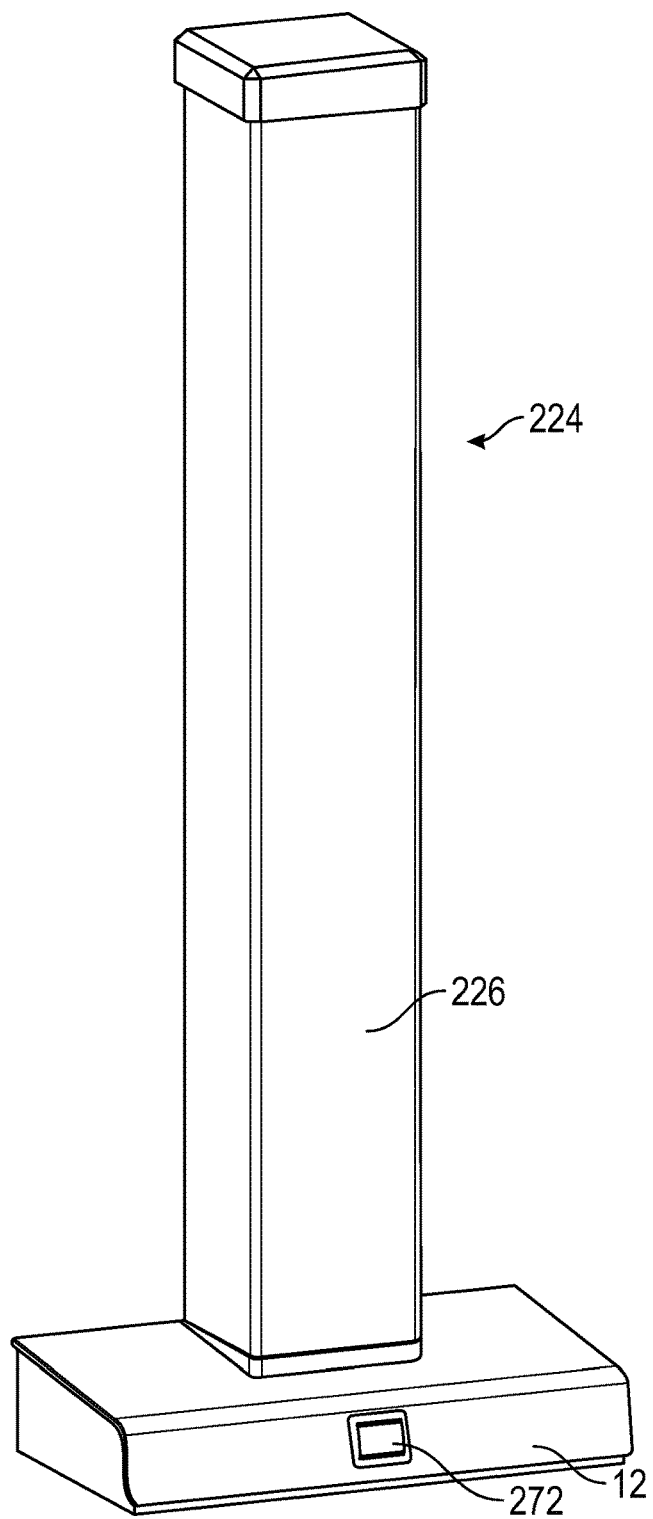
FIG. 25 is a perspective view of a lift column in accordance with the present invention.

FIG. 23 shows another embodiment of a multi-display device 1010 in accordance with the present invention. In this embodiment the column 18 is comprised of a pair of inner extrusions 242a,242b that are fixedly joined together via a joiner 334. As shown in FIG. 24, the joiner 334 comprises a rigid tubular piece comprising four pairs of vertically-aligned mounting holes (for convenience, only mounting holes 336a,336b are labeled in FIG. 24) that is inserted within each of the inner extrusions 242a,242b. The inner extrusions 242a,242b are joined together by passing a bolt 339 through a hole 338 located in the inner extrusion 242a and into the mounting hole 336a and by passing a bolt 341 through a hole 340 located in the inner extrusion 242b and into the mounting hole 336b. This process is repeated for the other three sets of mounting holes of the joiner and inner extrusions 242a,242b.

By joining the inner extrusions 242a,242b together, a longer-length column 18 is created. In the embodiment of FIG. 22, a fixed-height device 1010 having a pair of support beam rows 22a,22b is shown. Any number of support beam rows 22a,22b could be added to a properly-supported column 18, as would be appreciated by one of ordinary skill in the art.

FIGS. 25-29 show views of an embodiment of a lift column 224 that is powered by an actuator 246 that is located within the body thereof. In this embodiment, the lift column 224 is operable via a 3-position rocker switch 272 that may be switched into any of "UP," "DOWN," and "OFF" positions. Thus, the lift column 224 is used in order to change the operable height of any support beam row 22a that is attached thereto. The height of the lift column 224 may be adjusted in order to, for example, make fine adjustments of the height of the support beam row 22a based on the needs or desires of a user, to allow the height of the support beam row 22a to be changed for use by different users of a single workstation, or to allow the support beam row 22a to be used as a portion of a sit/stand workstation configuration.

In this embodiment, the lift column 224 comprises the base plate 12 that is used to connect the device to the support surface (see FIG. 23), the inner extrusion 242 that extends from the base plate 12, and an outer extrusion 226 to which the attachment bracket 20 is attached. A portion of the outer surface of the inner extrusion 242 is covered by a plurality of extrusion covers 240, which serve an aesthetic purpose by covering the inner extrusion 242 from view as the position of the outer extrusion 226 is adjusted such that it does not cover the entire inner extrusion 242.

Figure 26:
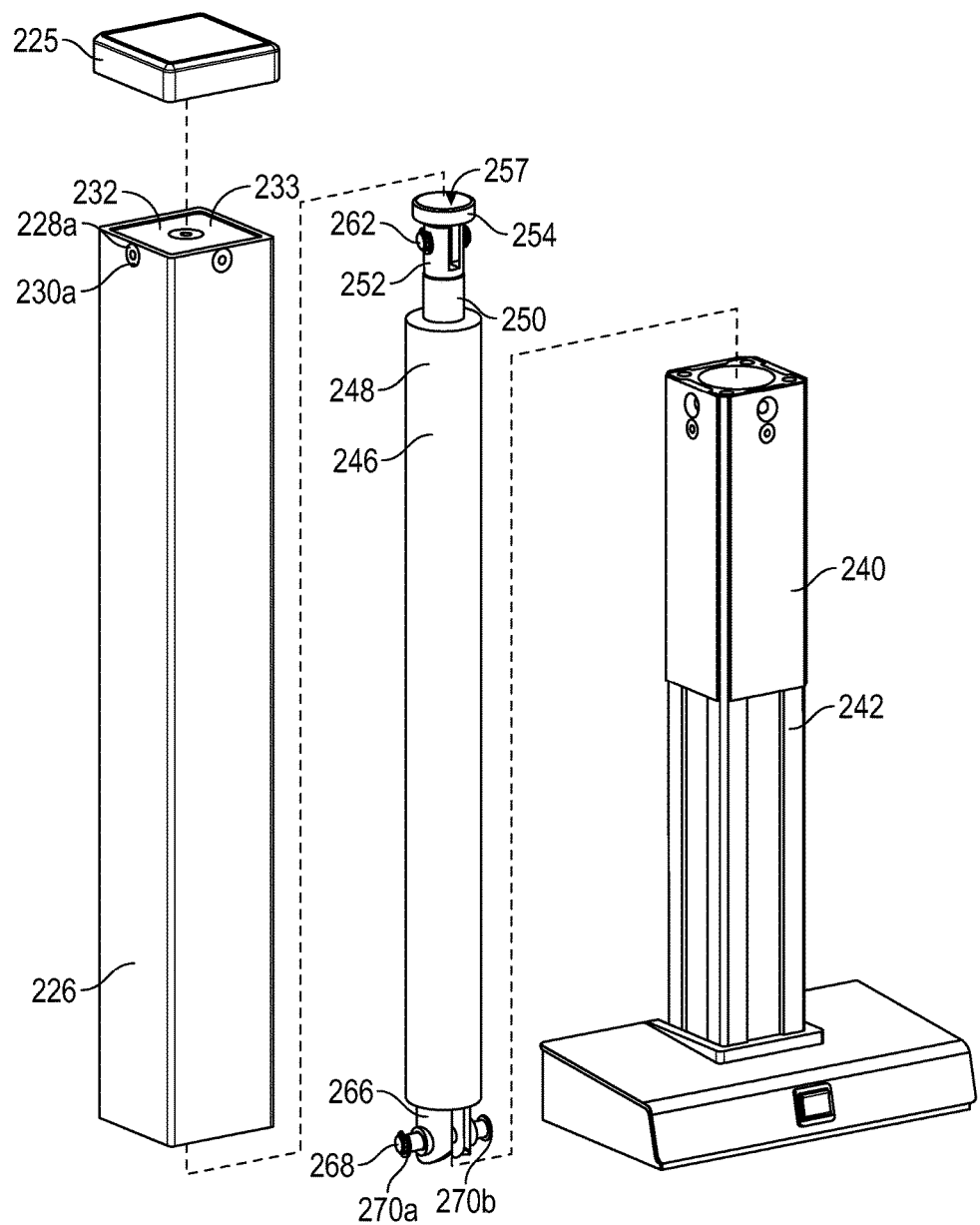
FIG. 26 is a partial exploded view thereof.
Figure 27:
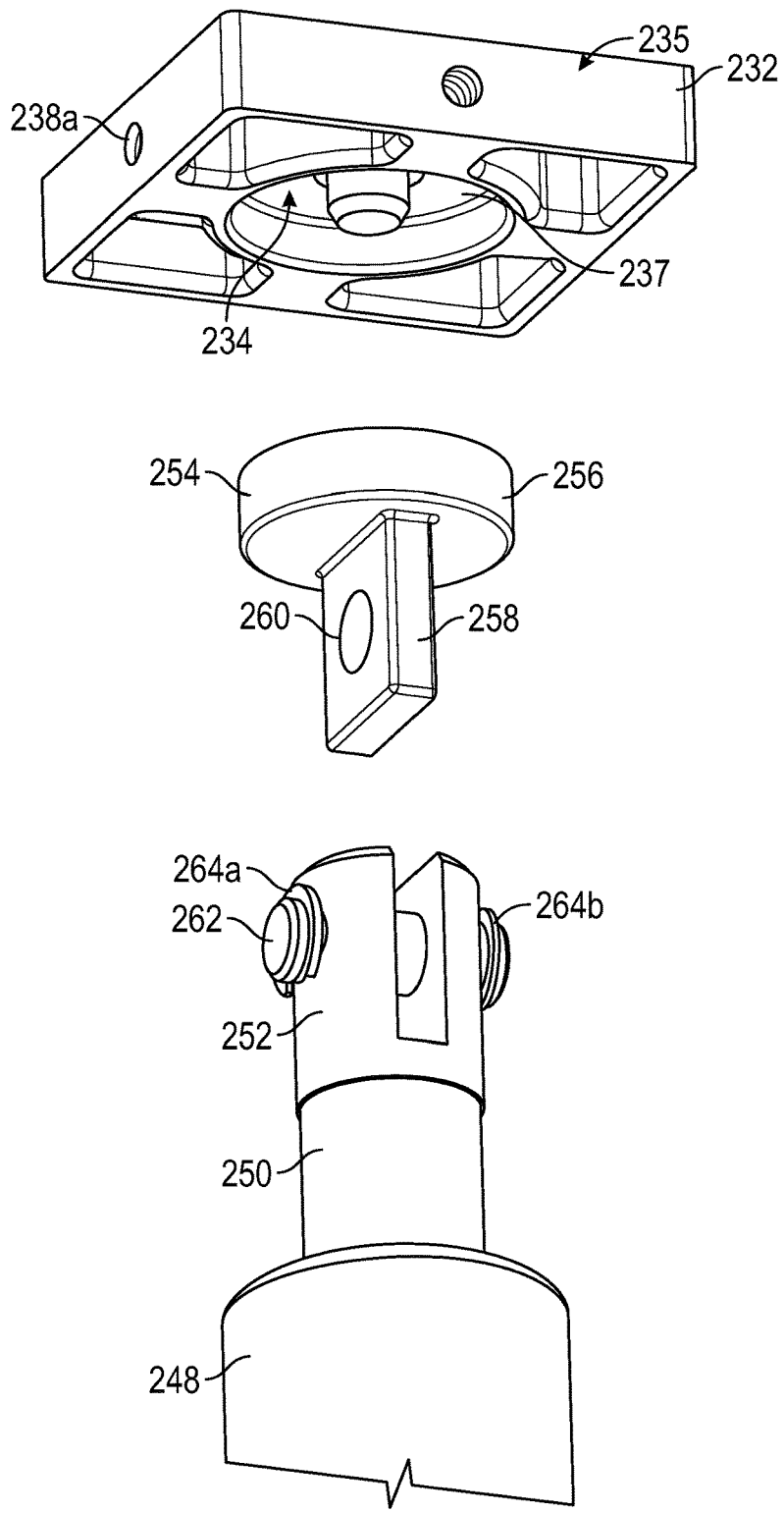
FIGS. 27-29 are partial views of portions of the lift column of FIG. 25.

A top block 232 is securely fixed at a top end of the outer extrusion 226 via a plurality of fasteners 230a-230d (for convenience, only fastener 230a labeled in FIG. 26), each of which is passed through a respective one of the top block mounting holes 228a-228d (for convenience, only top block mounting hole 228a is labeled in FIG. 26) located in the outer extrusion 226 and secured into a respective one of the fastener holes 238a-238d (for convenience, only fastener hole 238a labeled in FIG. 27) located in an outer surface 235 of the top block 232. The top block 232 is sized and shaped so that its outer surface 235 sits snugly against the inner surfaces of the outer extrusion 226. The top block 232 has a top surface 233 and a bottom surface 234 that includes a cutout region 237. A cap 225 may be used to cover the top end of the outer extrusion 226.

The lift column 224 further comprises an actuator 246 having a body 248 and a rod 250 that extends from and retracts within the body 248. An upper end 252 of the actuator 246 is attached to a converter 254 that comprises a disc portion 256 and a tab portion 258 having a mounting hole 260. The converter 254 attaches via a pin 262 through the mounting hole 260 located in the tab portion 258, and the pin 262 is secured in place via a pair of retaining clips 264a,264b. The disc portion 256 of the converter 254 has an upper side 257 that mates within the cutout region 237 of the top block 232. As the actuator rod 250 moves up and down, the disc portion 256 of the converter 254 moves the top block 232 and the attached outer extrusion 226 (along with any attached support beam row 22a).

Figure 28:
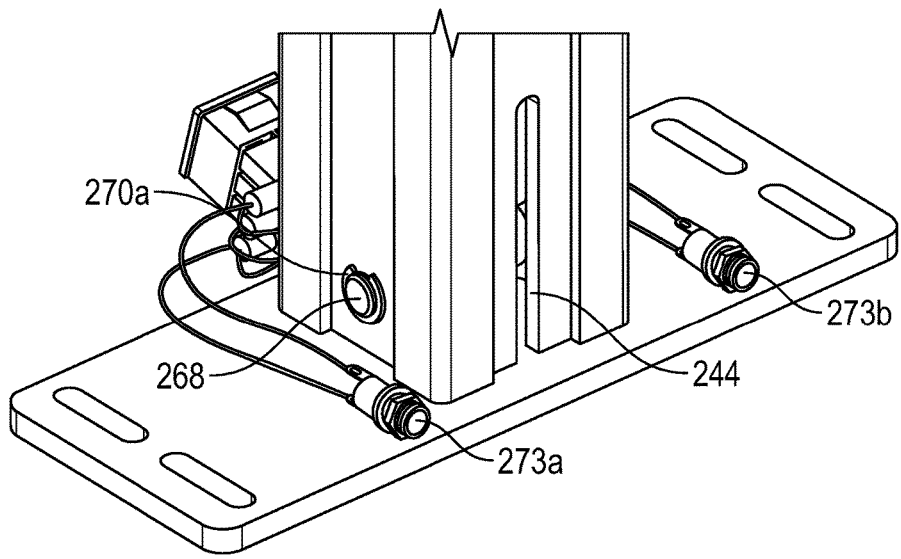

The actuator 246 also comprises a lower end 266 that is attached to the inner extrusion 242 via a pin 268 that passes through the inner extrusion 242 and is retained in place via a pair of retaining clips 270a,270b (see FIG. 28). As noted above, the inner extrusion is fixedly attached to the base plate 12; thus, the position of the lower end 266 of the actuator 246 is also fixed in place within the lift column 224. As seen in FIG. 28, the bottom end of the inner extrusion 242 has a cable slot 244 therein so that wires running to the actuator 246 can pass out of the lift column 224.

Figure 29:
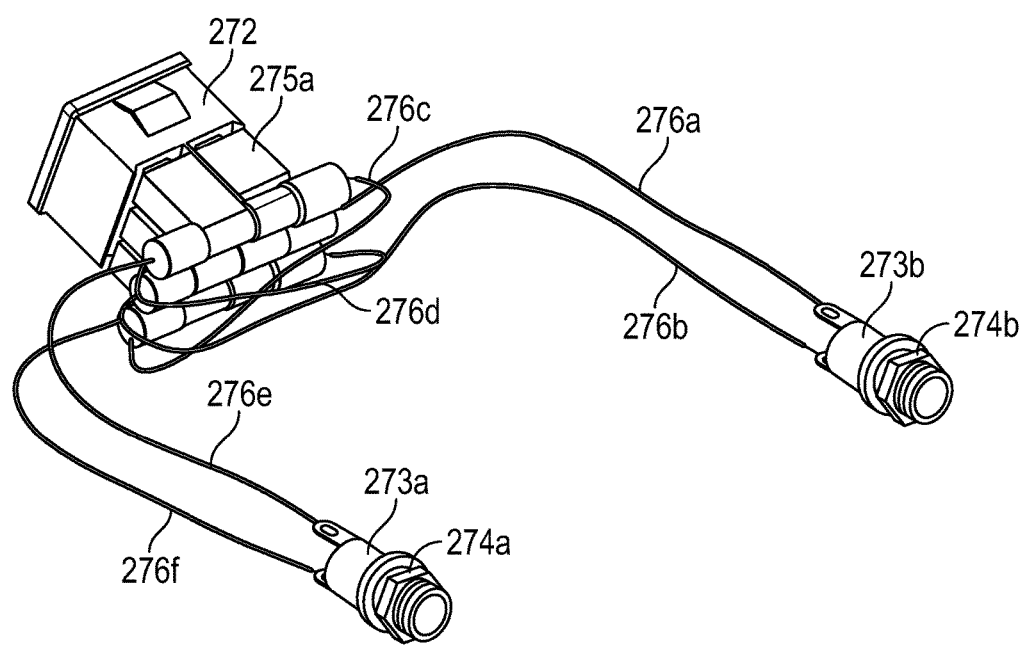

The wiring of the rocker switch 272 is shown in FIGS. 28 and 29. The rocker switch 272 is attached to a pair of jacks 273a,273b, which respectively provide power and drive means to the actuator 264. Jacks 273a,273b are each secured to the base plate cover 16 via a respective jack nut 274a, 274b. In this embodiment, six wire connectors (for convenience, only wire connector 275a is labeled in FIG. 29) attach to the rocker switch 272, and six wires 276a-f connect the wire connectors together and to the jacks 273a,273b, as would be understood by one of ordinary skill in the art.

Figure 30:
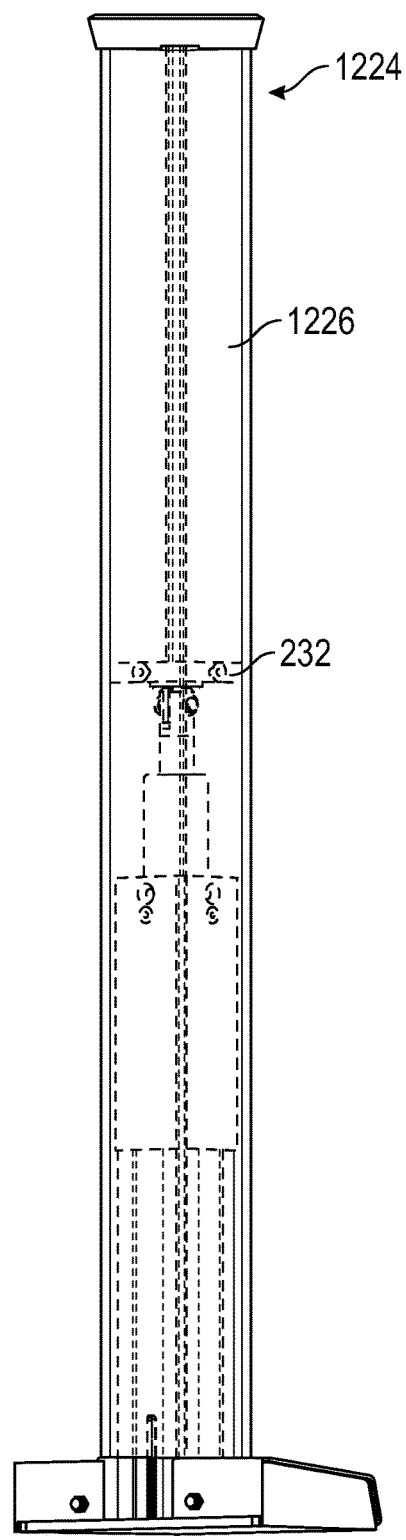
FIG. 30 is an alternate embodiment of a lift column in accordance with the present invention.
Figure 33:
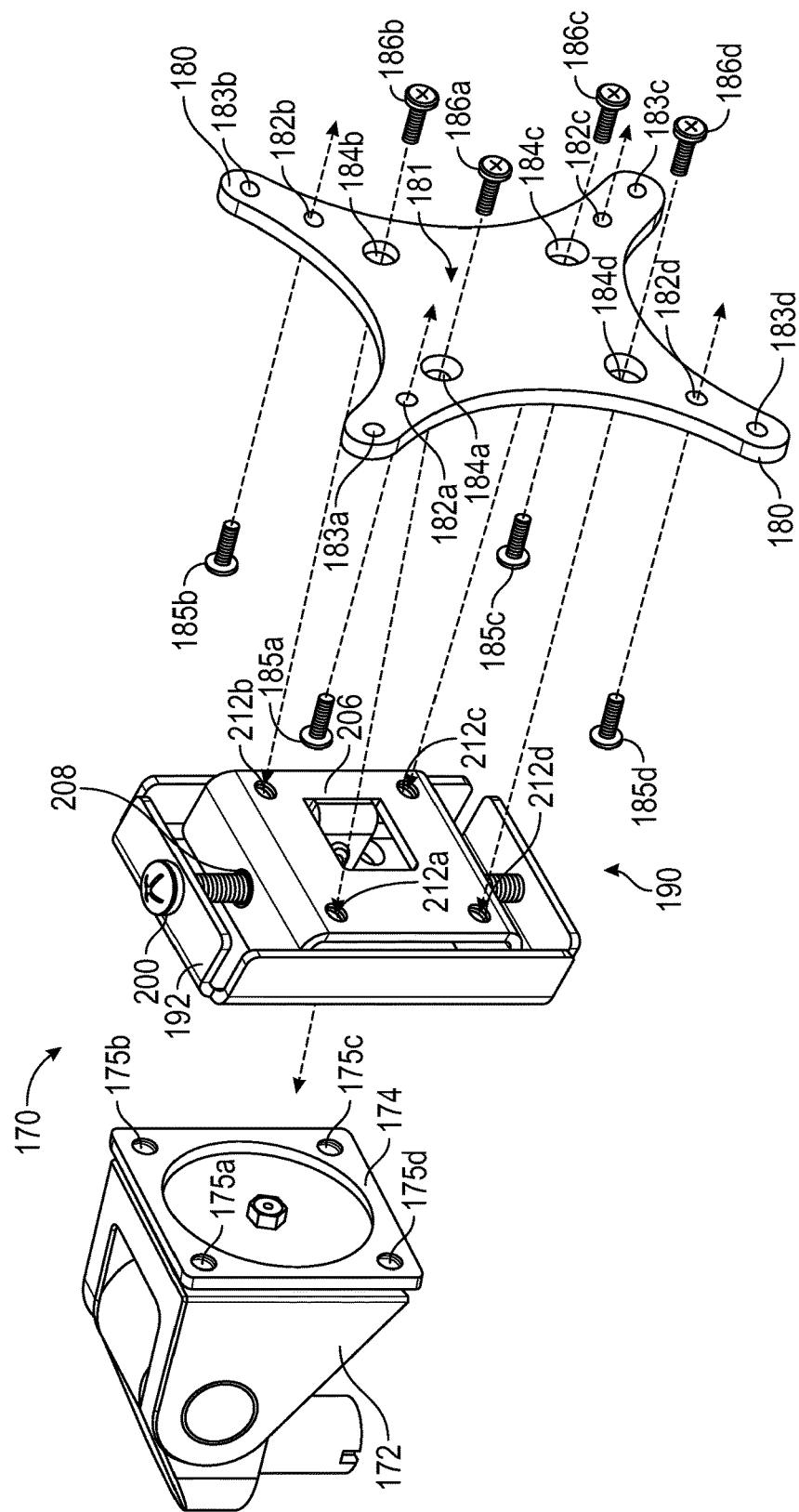
FIG. 33 is a partial exploded view of the display support of FIG. 31.

An alternate embodiment of a lift column 1224 is shown in FIG. 30. In this embodiment, the outer extrusion 1226 is of double height, such that the top block 232 connects to the middle of the outer extrusion 1226, not to the top thereof. This embodiment is otherwise identical to the embodiment shown in FIGS. 25-29. This outer extrusion 1226 of increased length permits for more support beam rows 22a to be provided on the lift column 1224.

FIGS. 31A-36 show two alternate embodiments of device height-adjustment assemblies 190, 290 that permit for fine height adjustment of the attached display as portion of a display support 170. In some instances, it may be desirable to adjust the height of adjacent displays such that, for example, their upper surfaces or centerlines are horizontally aligned. This is particularly an issue where displays of different weights or dimensions are used within a single support beam row 22a. The device height-adjustment assemblies 190, 290 described herein address these issues.

In the embodiment of the display support 170 shown in FIGS. 31A-33, the display support 170 comprises a tilter 172 having a rotating plate 174 which includes a plurality of mounting holes 175a-175d located thereon. The rotating plate 174 permits rotation of an attached display about an axis that extends through the centers of the adjustment enclosure 192 and adapter plate 180. In alternate embodiments where it is desirable not to permit the attached displays to rotate about an axis that extends through the centers of the adjustment enclosure 192 and adapter plate 180, the rotating plate 174 may be omitted, and the adjustment enclosure 192 may be attached directly to the body of the tilter 172.

The device height-adjustment assembly 190 of this embodiment comprises an adjustment enclosure 192 having a plurality of tilter mounting holes 194a-194d, a pair of height adjustment screw holes 196a,196b, and a slot 214. The tilter mounting holes 194a-194d are used to connect the adjustment enclosure 192 to the mounting holes 175a-175d located in the rotating plate 174 of the tilter 172 via fasteners (not shown). An adapter plate mounting block or clevis block 206 is located within the adjustment enclosure 192 and is held in place via a height-adjustment screw 200 and an alignment bolt 215, which attaches through an alignment tab 213 in the clevis block 206 and is held in place by a bolt retaining ring 216. The alignment bolt 215 is free to move within the slot 214, and acts to prevent the clevis block 206 from rotating about the height-adjustment screw 200 as it is turned, thereby assuring that the clevis block 206 performs its intended height-adjustment function, as further described below.

The height-adjustment screw 200 has a head 201 and a threaded shaft 202. The head 201 extends outside of the adjustment enclosure 192, and the threaded shaft 202 extends through the height-adjustment screw hole 196a, through a threaded passage 208 located in the clevis block 206, and through the height-adjustment screw hole 196b, where it is fixedly secured outside of the adjustment enclosure 192 in place via a retaining clip 199. Because the height-adjustment screw 200 and clevis block 206 are captive within the adjustment enclosure 198, as the height-adjustment screw 200 is rotated via its head 201, the clevis block 206 moves upwardly and downwardly along the length of the height-adjustment screw 200.

An adapter plate 180 is attached to a plurality of adapter plate fastener holes 212a-212d located in the clevis block 206 by passing a respective one of a plurality of adapter plate fasteners 186a-186d through each of a respective one of a plurality of plate attachment holes 184a-184d located through the adapter plate 180 and engaging the respective one of the adapter plate fasteners 186a-186d with a respective one of the adapter plate fastener holes 212a-212d. In this embodiment, the adapter plate 180 further includes a first set of mounting holes 182a-182d and a second set of mounting holes 183a-183d, which are arranged according to, respectively, VESA-compliant 75 mm and 100 mm square hole patterns. In alternate embodiments, the adapter plate 180 need not include both sets of mounting holes, could include additional sets of mounting holes, or could include mounting holes according to some other hole pattern. In order to attach a display to the adapter plate 180, the display is placed adjacent to a front side 181 of the adapter plate and a plurality of display fasteners 185a-185d are routed through either the first set of mounting holes 182a-182d or the second set of mounting holes 183a-183d and are secured into the display. Because the adapter plate 180 is attached to the clevis block 206, a height adjustment of the clevis block 206 alters the height of the display that is attached to the adapter plate 180. In this way, fine height adjustability of the display is possible.

Figure 34:
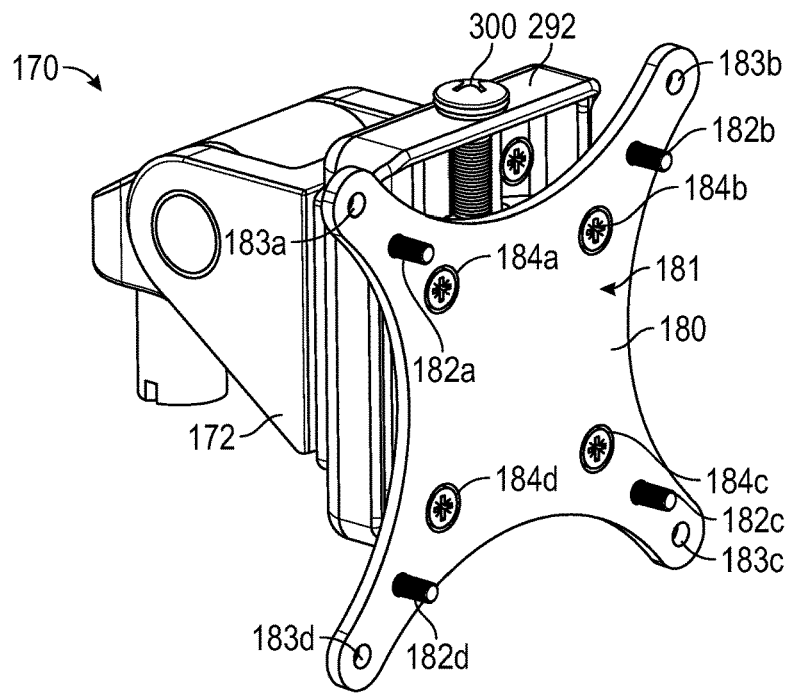
FIG. 34 is a perspective view of an alternate embodiment of a display support in accordance with the present invention.
Figure 35:
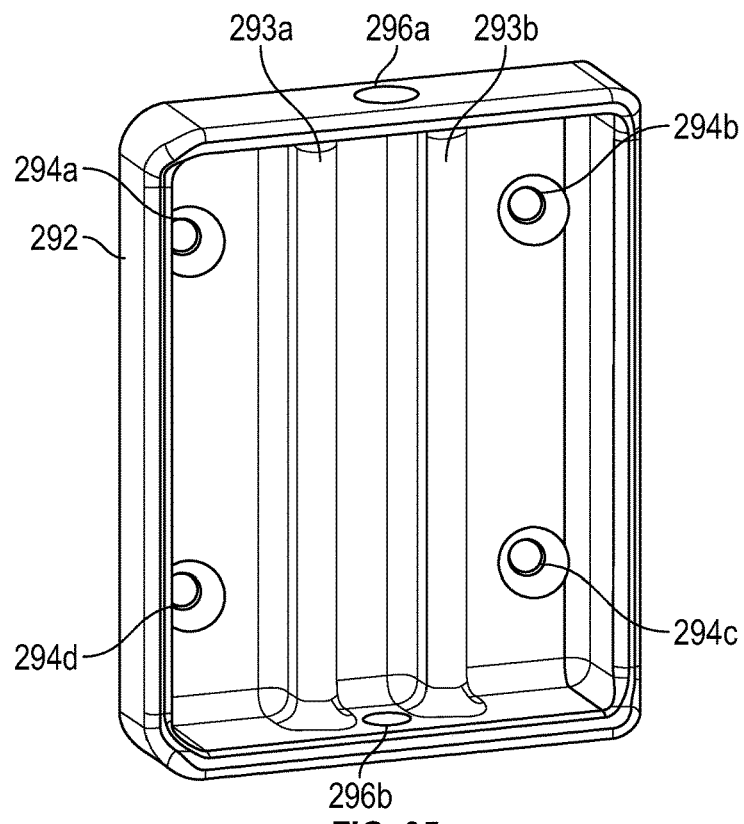
FIG. 35 is a perspective view of an adjustment enclosure thereof.
Figure 36:
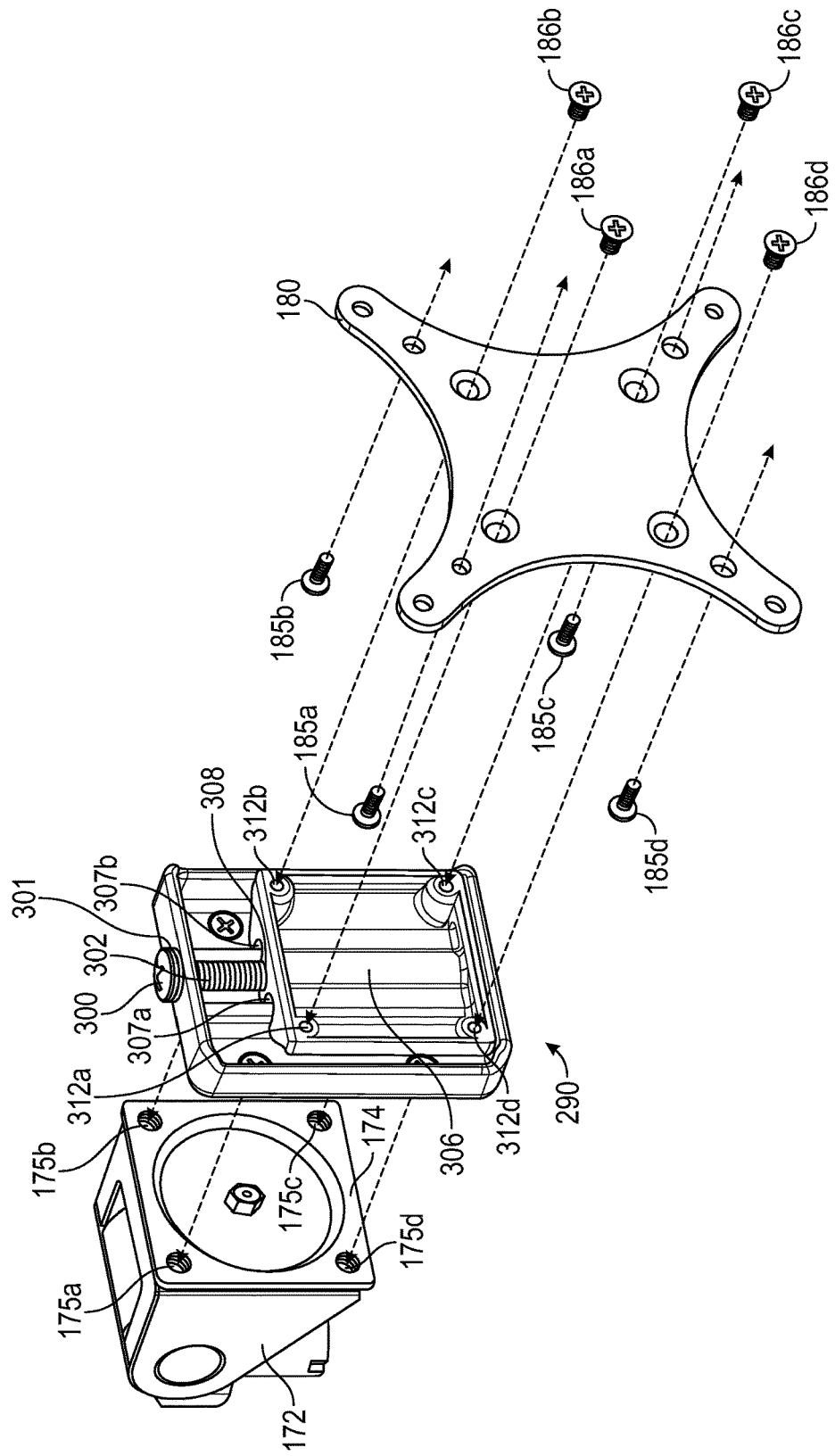
FIG. 36 is a partial exploded view of the display support of FIG. 34.

In another embodiment of the display support 170, shown in FIGS. 34-36, the device height-adjustment assembly 290 of this embodiment comprises an adjustment enclosure 292 having a plurality of tilter mounting holes 294a-294d, a pair of height-adjustment screw holes 296a,296b, and a pair of clevis block rails 293a,293b. The tilter mounting holes 294a-294d are used to connect the adjustment enclosure 292 to the mounting holes 175a-175d located in the rotating plate 174 of the tilter 172 via fasteners (partially shown but not labeled in FIG. 34). An adapter plate mounting block or clevis block 306 is located within the adjustment enclosure 292 and held in place via height-adjustment screw 300 and the interaction of each of a pair of clevis block slots 307a,307b of the clevis block with a respective one of the clevis block rails 293a,293b. The interaction of the clevis block slots 307a,307b with the clevis block rails 293a,293b prevents the clevis block 306 from rotating about the height-adjustment screw 300 as it is turned, thereby assuring that the clevis block 306 performs its intended height-adjustment function, as further described below.

The height-adjustment screw 300 has a head 301 and a threaded shaft 302. The head 301 extends outside of the adjustment enclosure 292, and the threaded shaft 302 extends through the height-adjustment screw hole 296a, through a threaded passage 308 located through the clevis block 306, and through the height-adjustment screw hole 296b, where it is fixedly secured outside of the adjustment enclosure 292 in place via a lock washer or pin (not shown). Because the height-adjustment screw 300 and clevis block 306 are captive within the adjustment enclosure 298, as the height-adjustment screw 300 is rotated via its head 301, the clevis block 306 moves upwardly and downwardly along the length of the height-adjustment screw 300. The adapter plate 180 is attached to a plurality of adapter plate fastener holes 312a-312d located in the clevis block 306 by passing a respective one of a plurality of adapter plate fasteners 186a-286d through each of a respective one of a plurality of plate attachment holes 284a-284d located through the adapter plate 180 and engaging the respective one of the adapter plate fasteners 186a-186d with a respective one of the adapter plate fastener holes 312a-312d. Because the adapter plate 180 is attached to the clevis block 306, a height adjustment of the clevis block 306 alters the height of a display that is attached to the adapter plate. In this way, fine height adjustability of the display is possible.

Figure 37:
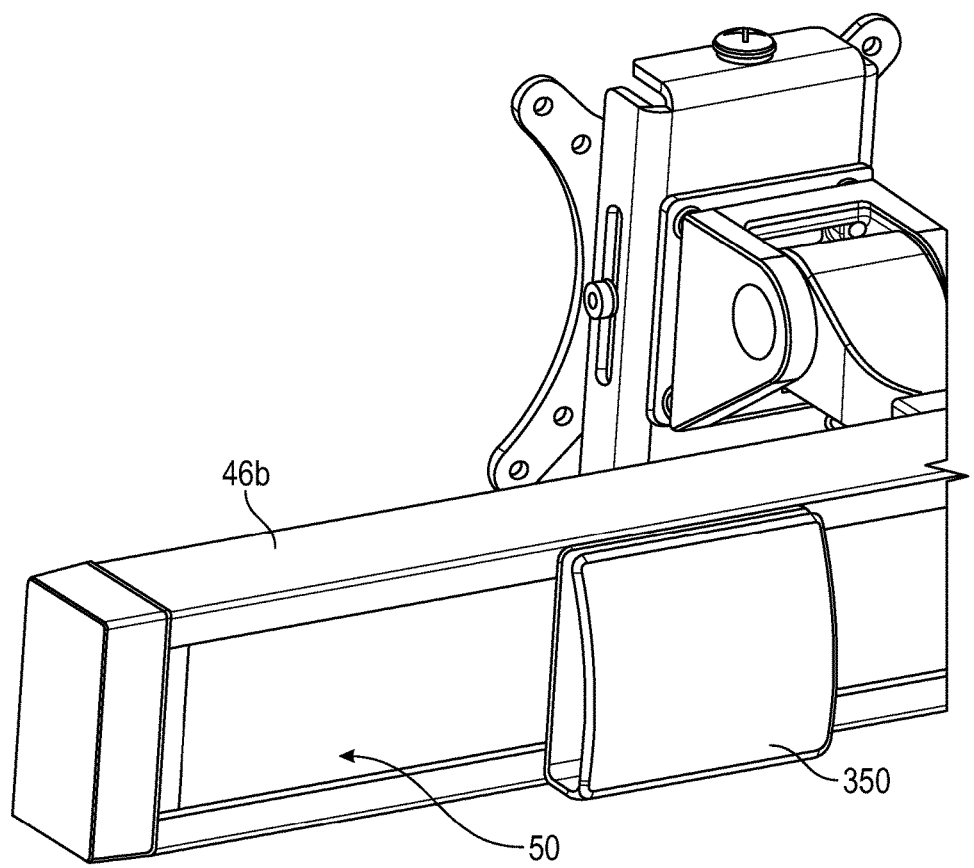
FIG. 37 is a rear perspective view showing an embodiment of a cable router attached to the rear side of a beam member in accordance with the present invention.
Figure 38A:
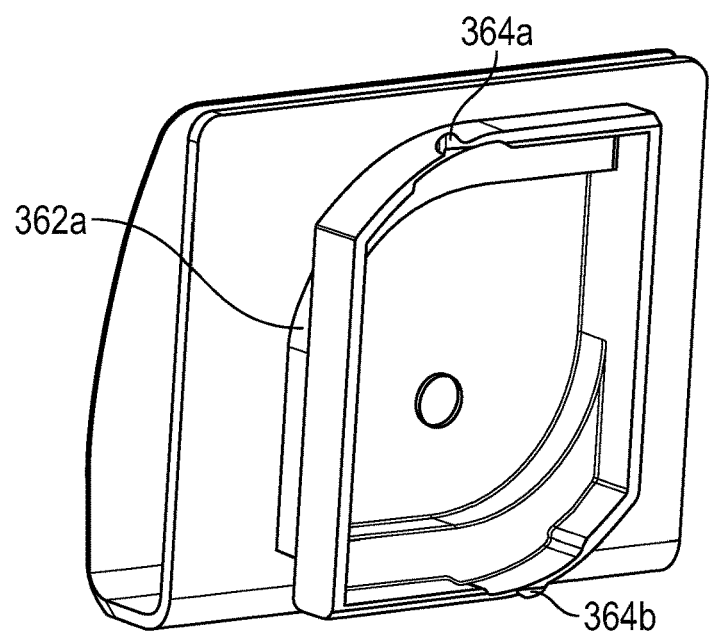
FIG. 38A is a rear perspective view of the cable router.
Figure 38B:
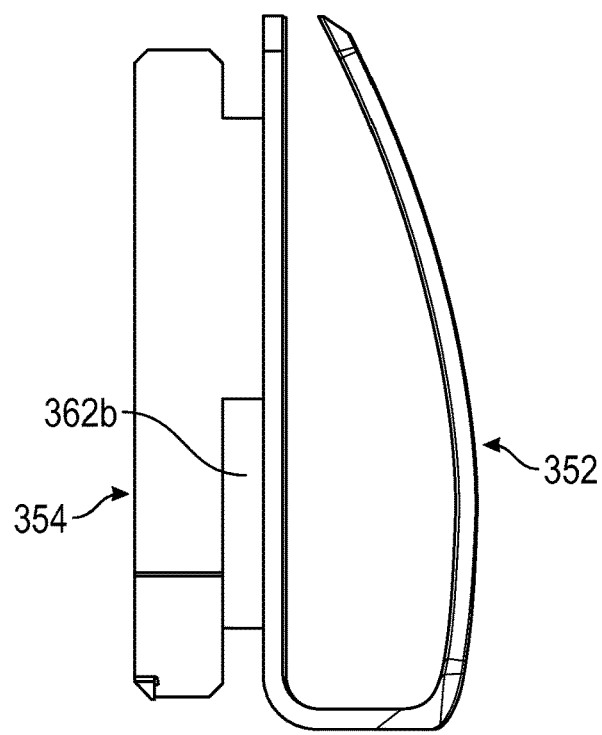
FIG. 38B is a side view thereof.

FIGS. 37-38B show a cable router 350 for attachment to either of the front or rear side of one of the beam members. In FIG. 37, the cable router 350 is shown attached to the rear side 50 of a side beam member 46b. The cable router 350 permits device cables to be routed approximately along the front or rear side of a support beam row 22a without sagging or coming into contact with other objects. In this embodiment, the cable router 350 has a front side 352, a rear side 354, a slot 360 into which device cables are placed, a pair of ramped portions 362a,362b, and a pair of tabs 364a,364b. To install the cable router 350 on beam member 46b, the cable router 350 is inserted into the rear side 50 of the beam member 46b in a position that is approximately 90 degrees counter-clockwise from the position shown in FIG. 37, and then the cable router 350 is rotated in a clockwise direction until the ramped portions 362a,362b ride along the rails 40c,40d of the beam member and the tabs 364a,364b lock behind the rails 40c,40d, thereby fixing the cable router 350 in position.

FIGS. 39-42 show various different configurations of a multi-display device that are possible using the parts of the present invention described above. These examples are not intended to be exhaustive, but in fact only show a small percentage of all of the configurations of a multi-display device that are possible within the scope of the present invention. In fact, Applicant appreciates that an infinite number of configurations are possible within the scope of the present invention.

Figure 39:
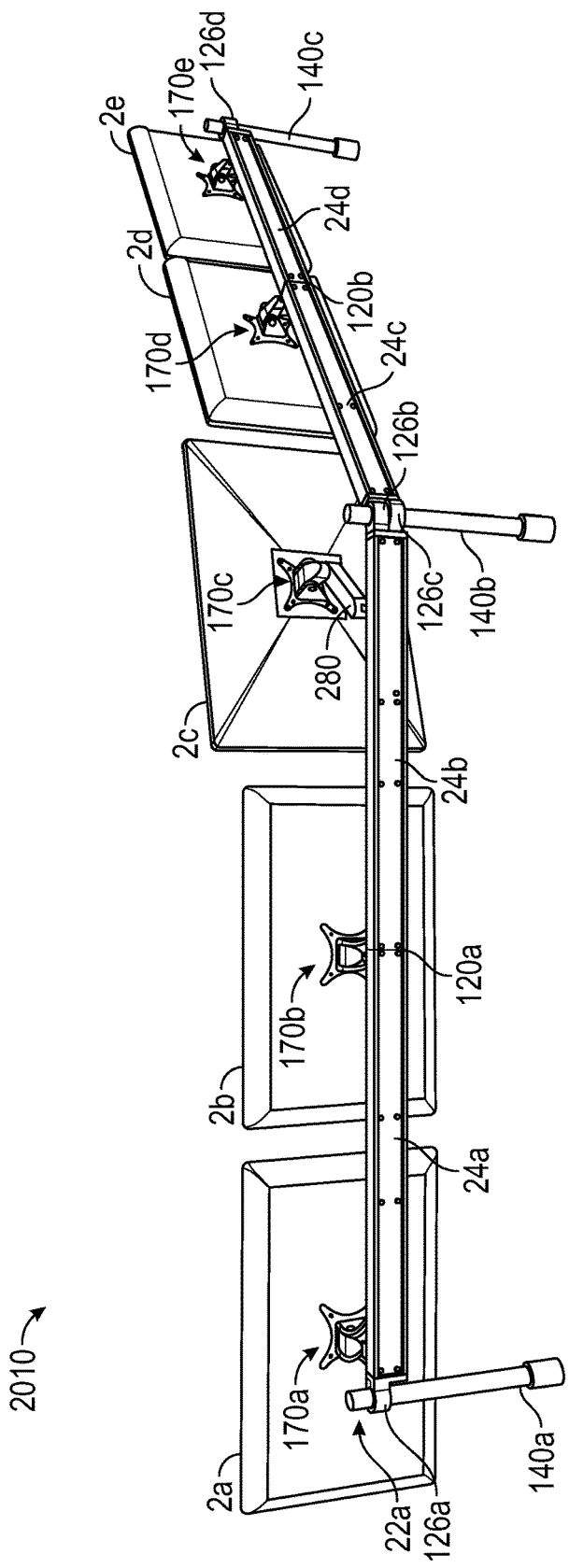
FIG. 39 is an alternate configuration of a multi-display device in accordance with the present invention.

FIG. 39 shows an embodiment of a multi-display device 2010 according to the present invention. In this embodiment, the device 2010 comprises a first pair of center beam members 24a,24b which are attached together via a rigid joint 120a and a second pair of center beam members 24a,24b which are attached together via a rigid joint 120b which are supported from the support surface via three support poles 140a-140c. In this embodiment, a first pole mount bracket 126a is attached at one end of the support beam row 22a and attaches to support pole 140a, a second pole mount bracket 126d is attached at the other end of the support beam row 22a and attaches to support pole 140c, and a pair of additional pole mount brackets 126b,126c attach center beam members 24b,24c together to form a bend at support pole 140b. In this embodiment, five display supports 170a-170e are attached to the support beam row 22a and support, respectively, displays 2a-2e. Display support 170c is connected to the center beam member 24b via a forearm 280.

Figure 40:
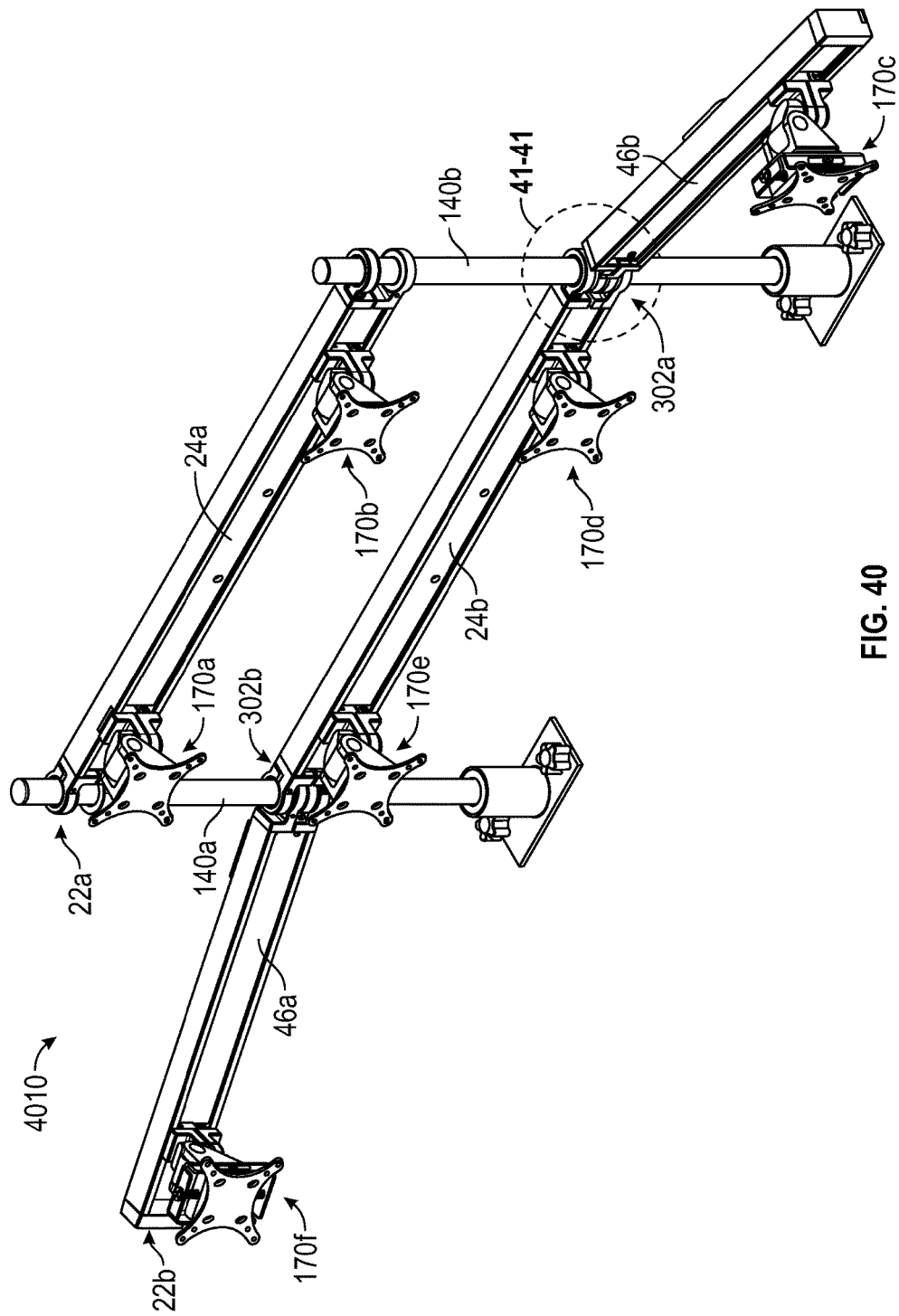
FIG. 40 is a front perspective view of another alternate configuration of a multi-display device in accordance with the present invention.
Figure 41:
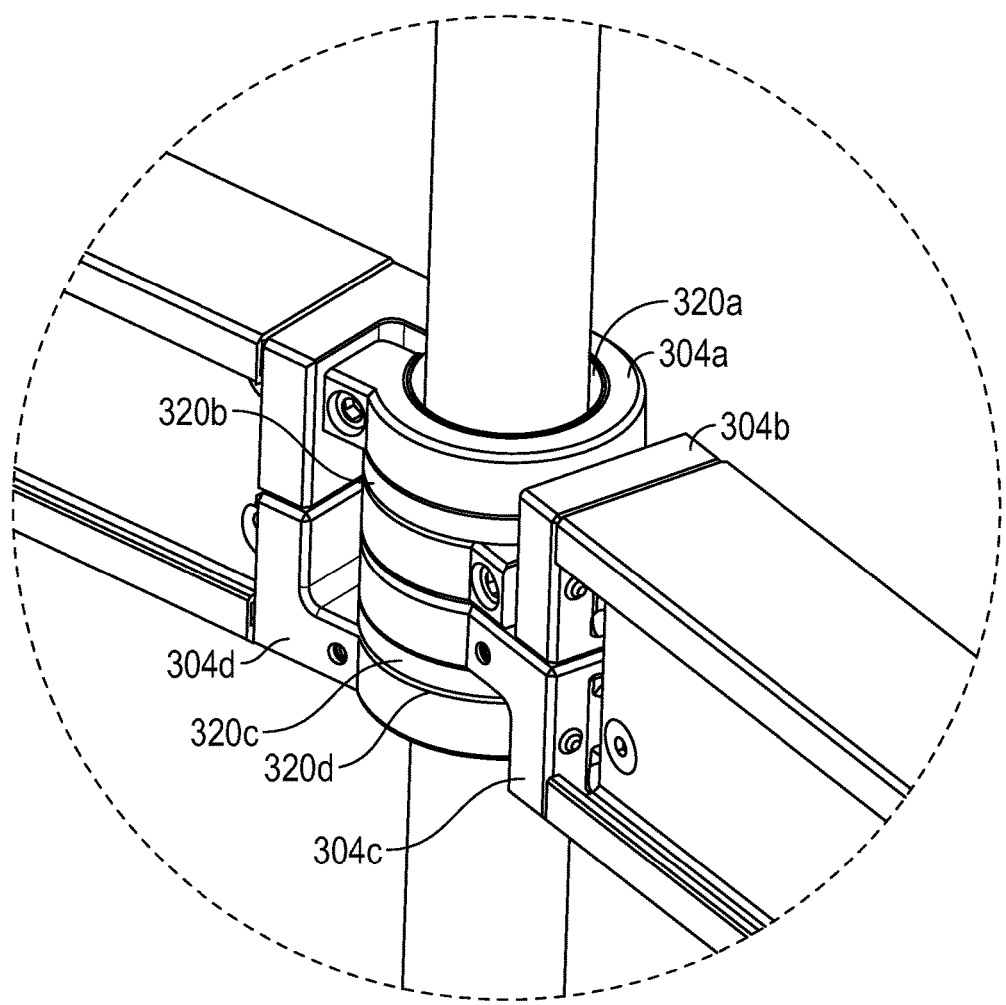
FIG. 41 is a close-up view of the area marked 41-41 in FIG. 40.

FIG. 40 shows another embodiment of a multi-display device 4010 according to the present invention. In this embodiment, the device 4010 comprises a first support beam row 22a comprising a center beam member 24a and a second support beam row 22b comprising a center beam member 24b and a pair of side beam members 46a,46b which are attached to the center beam member 24b via a pair of joints 302a,302b. The support beam rows 22a,22b are supported from the support surface via a pair of support poles 140a,140b that are attached to the rear sides 28a,28b of the center beam members 24a,24b via pole mount brackets 126a-126d. The device 4010 comprises six display supports 170a-170f. As shown in the close-up view of FIG. 41, the joint 302a—which is identical to joint 302b—is comprised of four pole mount cups 304a-304d and four pole mount bushings 320a-320d.

Figure 42:
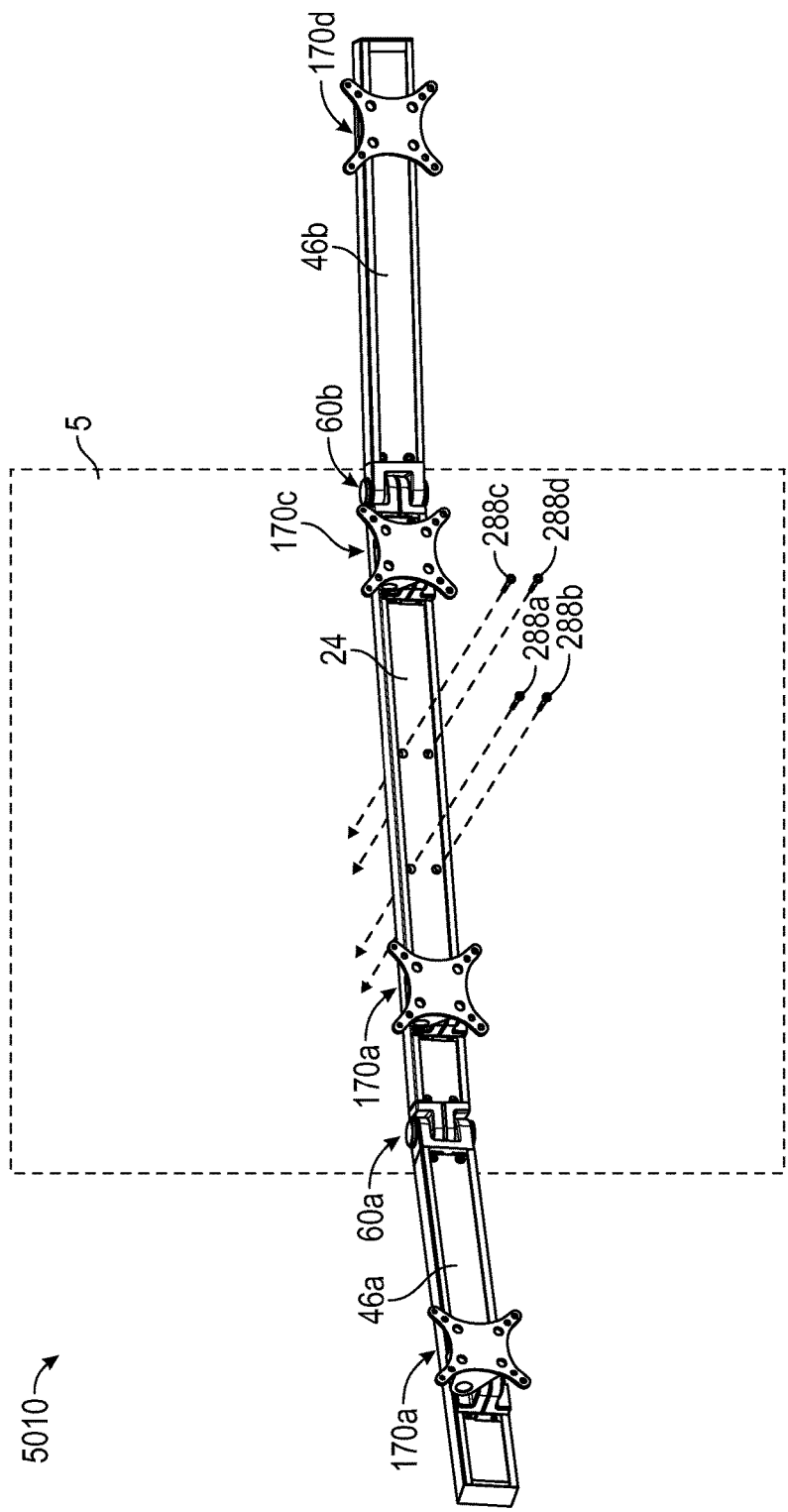
FIG. 42 is a front perspective view of another alternate configuration of a multi-display device in accordance with the present invention.

FIG. 42 shows another embodiment of a multi-display device 5010 according to the present invention. In this embodiment, the device 5010 comprises a support beam row 22a comprising a center beam member 24 and a pair of side beam members 46a,46b which are attached to the center beam member 24 via a pair of hinge joints 60a,60b. In this embodiment, the support beam row 22a is directly attached to a vertical surface 5 (e.g., a wall, cubicle panel, etc.) via a plurality of fasteners 288a-288d, which are routed through the mounting holes 34*a*-34*d* which are located through the center beam member 24. The fasteners 288*a*-288*d* may be screws, bolts, lags, or any other suitable type of fastener, according to what is required under the circumstances in order to securely mount the support beam row 22*a* to the vertical surface 5. In this embodiment, four display supports 170*a*-170*d* are provided. Display supports 170*b*,170*c* are attached to the front side (not labeled) of the center beam member 24, display support 170*a* is attached to the front side (not labeled) of the side beam member 46*a*, and display support 170*d* is attached to the front side (not labeled) of the side beam member 46*b*. In alternate embodiments, one or more support beam rows, which can each include or exclude hinge joints, may be attached directly to the vertical surface 5 in order to create a video board.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A support system for supporting at least one display from a mounting surface, the support system comprising:
    a support apparatus that extends from the mounting surface;
    a first beam member, the first beam member being attached to the support apparatus and to a first hinge bracket;
    a second beam member attached to a second hinge bracket, the second beam member being rotatable with respect to the first beam member about a hinge joint, the hinge joint comprising the first hinge bracket, the second hinge bracket, and a hinge pin; and
    at least one display support attached to the second beam member;
    the first hinge bracket having a rear portion and a pair of spaced-apart couplings that collectively form a female portion, a first coupling of the pair of spaced-apart couplings including a first outer surface, a first inner surface opposite the first outer surface, and a first aperture extending through the first coupling from the first outer surface to the first inner surface, and a second coupling of the pair of spaced-apart couplings including a second outer surface, a second inner surface opposite the second outer surface, and a second aperture extending through the second coupling from the second outer surface to the second inner surface, wherein at least one of the first aperture and the second aperture has a non-circular cross-sectional area that is uniform from a corresponding one of the first outer surface and the second outer surface to a corresponding one of the first inner surface and the second inner surface;
    the second hinge bracket having a rear portion and at least one protruding portion, the protruding portion including a third aperture;
    the hinge pin having a locking portion and a shaft, the locking portion having a non-circular cross-sectional area that is complementary to the non-circular cross-sectional area of the at least one of the first aperture and the second aperture;
    wherein when the hinge joint is fully assembled by aligning the first and second apertures of the first hinge bracket with the third aperture of the second hinge bracket and inserting the hinge pin through the first, second, and third apertures, the locking portion of the hinge pin engages the non-circular cross-sectional area of the at least one of the first aperture and the second aperture so that the hinge pin is not rotatable relative to the first hinge bracket, but the second hinge bracket is rotatable about the hinge pin.

2. The support system of claim 1, the hinge pin further comprising a head located atop the locking portion and the shaft, the first aperture having a first aperture depth and the second aperture having a second aperture depth, wherein when the hinge joint is fully assembled the locking portion extends from the head a distance that is no greater than the respective one of the first aperture depth and the second aperture depth.

3. The support system of claim 1, further comprising a washer having a disc portion and at least one protrusion extending from the disc portion, the at least one protrusion being shaped and positioned to engage at least one slot located in a bottom surface of the shaft and prevent rotation of the shaft relative to the disc portion.

4. The support system of claim 1, further comprising a first bushing having a first portion that is located within the third aperture and between the third aperture and the shaft when the hinge joint is fully assembled and a second portion extending from the first portion that is located between the protruding portion and the first coupling when the hinge joint is fully assembled; and
    a second bushing having a first portion that is located within the third aperture and between the third aperture and the shaft when the hinge joint is fully assembled and a second portion extending from the first portion that is located between the protruding portion and the second coupling when the hinge joint is fully assembled.

5. The support system of claim 1, the hinge pin further comprising a head located atop the locking portion and the shaft, the head having a perimeter that is larger than the first aperture or second aperture so that when the hinge joint is fully assembled with the head of the hinge pin adjacent a respective one of the first aperture and second aperture, the head cannot move into or through the respective one of the first aperture and second aperture.

6. The support system of claim 1, the rear portion of the first hinge bracket having at least one mounting protrusion extending in a direction opposite to the female portion thereof and the rear portion of the second hinge bracket having at least one mounting protrusion extending in a direction opposite to the protruding portion thereof.

7. The support system of claim 6, wherein the first beam member is attached to the at least one mounting protrusion of the first hinge bracket and wherein the second beam member is attached to the at least one mounting protrusion of the second hinge bracket.

8. The support system of claim 6, wherein at least one of the mounting protrusions comprises a body portion and a threaded aperture routed at least partially through the body portion.

9. The support system of claim 1, wherein when the first beam member is attached to the first hinge bracket, the second beam member is attached to the second hinge bracket, the first hinge bracket is attached to the second hinge bracket via the hinge pin, and neither the first hinge bracket nor the second beam member is subject to any load, a distal end of the second beam member located away from the hinge joint is located higher than a proximal end of the second beam member located adjacent to the hinge joint.

10. The support system of claim 1, wherein when the first hinge bracket and the second hinge bracket are attached together and neither hinge bracket is subject to any load, a top surface of the first hinge bracket is not level with a top surface of the second hinge bracket.

11. The support system of claim 1, wherein the non-circular cross-sectional area of at least one of the first aperture and the second aperture has a cross-sectional shape that is approximately that of an uppercase "D".

12. The support system of claim 1, further comprising a threaded member that is routed through a threaded passage located in a wall of the second hinge bracket, the threaded member comprising an end portion that is extendable into the third aperture by rotating the threaded member within the threaded passage.

13. A support system for supporting at least one display from a mounting surface, the support system comprising:
a support apparatus that extends from the mounting surface;
a first beam member, the first beam member being attached to the support apparatus and to a first hinge bracket;
a second beam member attached to a second hinge bracket, the second beam member being rotatable with respect to the first beam member about a hinge joint, the hinge joint comprising the first hinge bracket, the second hinge bracket, and a hinge pin; and
at least one display support attached to the second beam member;
the first hinge bracket having a front surface, a rear surface opposite the front surface, a top surface, and a pair of spaced-apart couplings extending from the front surface that collectively form a female portion, a first coupling of the pair of spaced-apart couplings including a first aperture, a second coupling of the pair of spaced-apart couplings including a second aperture;
the second hinge bracket having a rear surface, a top surface, and at least one protruding portion, the protruding portion including a third aperture, the female portion of the first hinge bracket and the protruding portion of the second hinge bracket being mated together such that the first and second apertures of the first hinge bracket are aligned with the third aperture of the second hinge bracket;
the hinge pin having a shaft that extends through the first, second, and third apertures;
wherein the first hinge bracket has an upper thickness defined by a distance between the rear surface and the front surface of the first hinge bracket proximate to the first coupling, and a lower thickness defined by a distance between the rear surface and the front surface of the first hinge bracket proximate to the second coupling, wherein the lower thickness is greater than the upper thickness.

14. The support system of claim 13, the rear portion of the first hinge bracket having at least one mounting protrusion extending in a direction opposite to the female portion thereof and the rear portion of the second hinge bracket having at least one mounting protrusion extending in a direction opposite to the protruding portion thereof, wherein the first beam member is attached to the at least one mounting protrusion of the first hinge bracket and wherein the second beam member is attached to the at least one mounting protrusion of the second hinge bracket.

15. The support system of claim 14, wherein the first beam member and second beam member each have identical front and rear channels, each of the front and rear channels comprising vertically-opposed top and bottom rails.

16. The support system of claim 13, the hinge pin further comprising a locking portion having a non-circular cross-sectional area and either of the first aperture and the second aperture having a non-circular cross-sectional area that is complementary in shape to the non-circular cross-sectional area of the locking portion, the locking portion being adapted to engage a respective one of the first aperture and second aperture having the non-circular cross-sectional area that is complementary in shape to the non-circular cross-sectional area of the locking portion.

17. The support system of claim 16, the hinge pin further comprising a head located atop the locking portion and the shaft, the head having a perimeter that is larger than the first aperture or second aperture so that when the hinge joint is fully assembled with the head of the hinge pin adjacent a respective one of the first aperture and second aperture, the head cannot move into or through the respective one of the first aperture and second aperture.

18. The support system of claim 13, further comprising:
a first bushing having a first portion that is located within the third aperture and between the third aperture and the shaft and a second portion extending from the first portion that is located between the protruding portion and the first coupling; and
a second bushing having a first portion that is located within the third aperture and between the third aperture and the shaft and a second portion extending from the first portion that is located between the protruding portion and the second coupling.

19. The support system of claim 13, further comprising a threaded member that is routed through a threaded passage located in a wall of the second hinge bracket, the threaded member comprising an end portion that is extendable into the third aperture by rotating the threaded member within the threaded passage.

20. A support system for supporting at least one display from a mounting surface, the support system comprising:
a support apparatus that extends from the mounting surface;
a central beam member attached to the support apparatus and to a first side of a hinge joint, the hinge joint comprising a first hinge bracket, a second hinge bracket, and a hinge pin, the first hinge bracket having at least two spaced-apart couplings that collectively form a female portion, a first coupling of the at least two spaced-apart couplings including a first aperture and a second coupling of the at least two spaced-apart couplings including a second aperture, the second hinge bracket having at least one protruding portion, the at least one protruding portion including a third aperture, and the hinge pin extending through the first, second, and third apertures;
a side beam member attached to a second side of the hinge joint, the side beam member including a mass, a proximal end attached to the hinge joint, a distal end opposing the proximal end, an upper side that extends from the proximal end to the distal end, a lower side opposite the upper side that extends from the proximal end to the distal end, and a midline that is equidistant from the upper side and the lower side and extends from the proximal end to the distal end; and at least one display support adapted to support the at least one display, the at least one display support having a mass and being attached to the side beam member;

wherein when the hinge joint is not subject to a load other than the masses of the side beam member and the at least one display support, a distal end of the midline located at the distal end of the second beam member is higher than a proximal end of the midline located at the proximal end of the second beam member.

\* \* \* \* \*